(12) United States Patent
Mathews et al.

(10) Patent No.: US 12,107,878 B1
(45) Date of Patent: Oct. 1, 2024

(54) IDENTIFYING CRYPTOGRAPHY USAGE RISKS

(71) Applicant: ISARA Corporation, Waterloo (CA)

(72) Inventors: Justin Mathews, Waterloo (CA); Rob Williams, Waterloo (CA); Atsushi Yamada, Waterloo (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 18/461,399

(22) Filed: Sep. 5, 2023

(51) Int. Cl.
*H04L 9/40* (2022.01)

(52) U.S. Cl.
CPC .......... *H04L 63/1425* (2013.01); *H04L 63/20* (2013.01); *H04L 63/306* (2013.01)

(58) Field of Classification Search
CPC ............................ H04L 63/1425; H04L 63/20
USPC .......................................................... 726/22
See application file for complete search history.

(56) References Cited

U.S. PATENT DOCUMENTS

| | | | |
|---|---|---|---|
| 7,512,980 B2 | 3/2009 | Copeland et al. | |
| 8,074,267 B1* | 12/2011 | Stimpson | H04L 63/0471 |
| | | | 713/168 |
| 9,288,234 B2 | 3/2016 | Barr et al. | |
| 9,660,978 B1 | 5/2017 | Truskovsky et al. | |
| 10,362,373 B2 | 7/2019 | Anderson et al. | |
| 10,681,060 B2* | 6/2020 | Scheidler | G06N 20/00 |
| 10,805,341 B2 | 10/2020 | Anderson et al. | |
| 10,855,705 B2* | 12/2020 | Robertson | H04L 63/1433 |
| 10,868,834 B2* | 12/2020 | Anderson | H04L 41/0894 |
| 11,038,900 B2 | 6/2021 | Jusko et al. | |
| 11,265,159 B1 | 3/2022 | Truskovsky et al. | |
| 11,310,205 B2 | 4/2022 | Kleopa et al. | |
| 11,563,771 B2 | 1/2023 | Anderson et al. | |
| 2010/0218250 A1* | 8/2010 | Mori | H04L 63/1441 |
| | | | 709/224 |
| 2014/0059216 A1* | 2/2014 | Jerrim | H04L 67/104 |
| | | | 709/224 |
| 2018/0103056 A1* | 4/2018 | Kohout | H04L 63/0428 |
| 2019/0260796 A1* | 8/2019 | Hamdi | G06F 7/24 |
| 2020/0244706 A1* | 7/2020 | Young | G06Q 10/06393 |
| 2020/0252435 A1* | 8/2020 | Robertson | H04L 63/105 |
| 2020/0336508 A1* | 10/2020 | Srivastava | H04L 63/20 |
| 2021/0194894 A1 | 6/2021 | Anderson et al. | |
| 2022/0078208 A1 | 3/2022 | Anderson et al. | |

(Continued)

OTHER PUBLICATIONS

Quantum Xchange, "Quantum Xchange Announces the General Availability of CipherInsights for Cryptographic Risk Management", Press Release, Jun. 28, 2023, 1 page.

(Continued)

*Primary Examiner* — Badrinarayanan
*Assistant Examiner* — Badri-Champakesan
(74) *Attorney, Agent, or Firm* — Henry Patent Law Firm PLLC

(57) ABSTRACT

In a general aspect, risks associated with cryptography usage in network communication between computing nodes are identified. In some aspects, a network packet capture agent obtains cryptography usage data by examining network traffic communicated by computing nodes in the computing environment. A cryptography usage analysis agent identifies cryptography usage risks based on the cryptography usage data. A cryptographic risk identification agent identifies one or more applications associated with the cryptography usage risks.

20 Claims, 13 Drawing Sheets

(56) References Cited

U.S. PATENT DOCUMENTS

2023/0156034 A1* 5/2023 Naidoo ............... H04L 63/1425
726/23

OTHER PUBLICATIONS

Barnes, Richard, "The Poodle Attack and the End of SSL 3.0", https://blog.mozilla.org/security/2014/10/14/the-poodle-attack-and-the-end-of-ssl-3-0/, Oct. 14, 2014, 21 pages.

Combs, Gerald, "Wireshark", https://en.wikipedia.org/w/index.php?title=Wireshark&oldid=1172113406 (version dated Aug. 25, 2023), 6 pages.

Harris, Guy, et al., "PCAP Capture File Format", https://datatracker.ietf.org/doc/id/draft-gharris-opsawg-pcap-00.html, Dec. 22, 2020, 6 pages.

ISARA Corp, "ISARA Advance Crypo Agility Suite", product brochure available from ISARA, dated 2021, 2 pages.

ISARA Corp, "ISARA Advance Crypo Inventory and Planning", product brochure available from ISARA, dated 2021, 2 pages.

TANIUM, "Tanium Platform", product brochure available from https://site.tanium.com/rs/790-QFJ-925/images/PB-Tanium-Platform.pdf, dated 2021, 3 pages.

Tuexen, Michael, et al., "PCAP Next Generation (pcapng) Capture File Format", https://www.ietf.org/staging/draft-tuexen-opsawg-pcapng-02.html, Jun. 23, 2021, 42 pages.

Wikipedia, "ExtraHop Networks", https://en.wikipedia.org/w/index.php?title=ExtraHop_Networks&oldid=1153890094 (version dated May 8, 2023), 5 pages.

Wikipedia, "MD5", https://en.wikipedia.org/w/index.php?title=MD5&oldid=1172812859 (version dated Aug. 29, 2023), 13 pages.

Wikipedia, "Static application security testing", https://en.wikipedia.org/w/index.php?title=Static_application_security_testing&oldid=1172300977 (version dated Aug. 26, 2023), 5 pages.

ISA, International Search Report and Written Opinion issued in Application No. PCT/CA2023/051675 on May 15, 2024, 8 pages.

* cited by examiner

IDENTIFYING CRYPTOGRAPHY USAGE RISKS

BACKGROUND

The following description relates to identifying cryptography usage risks in a network environment.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1:
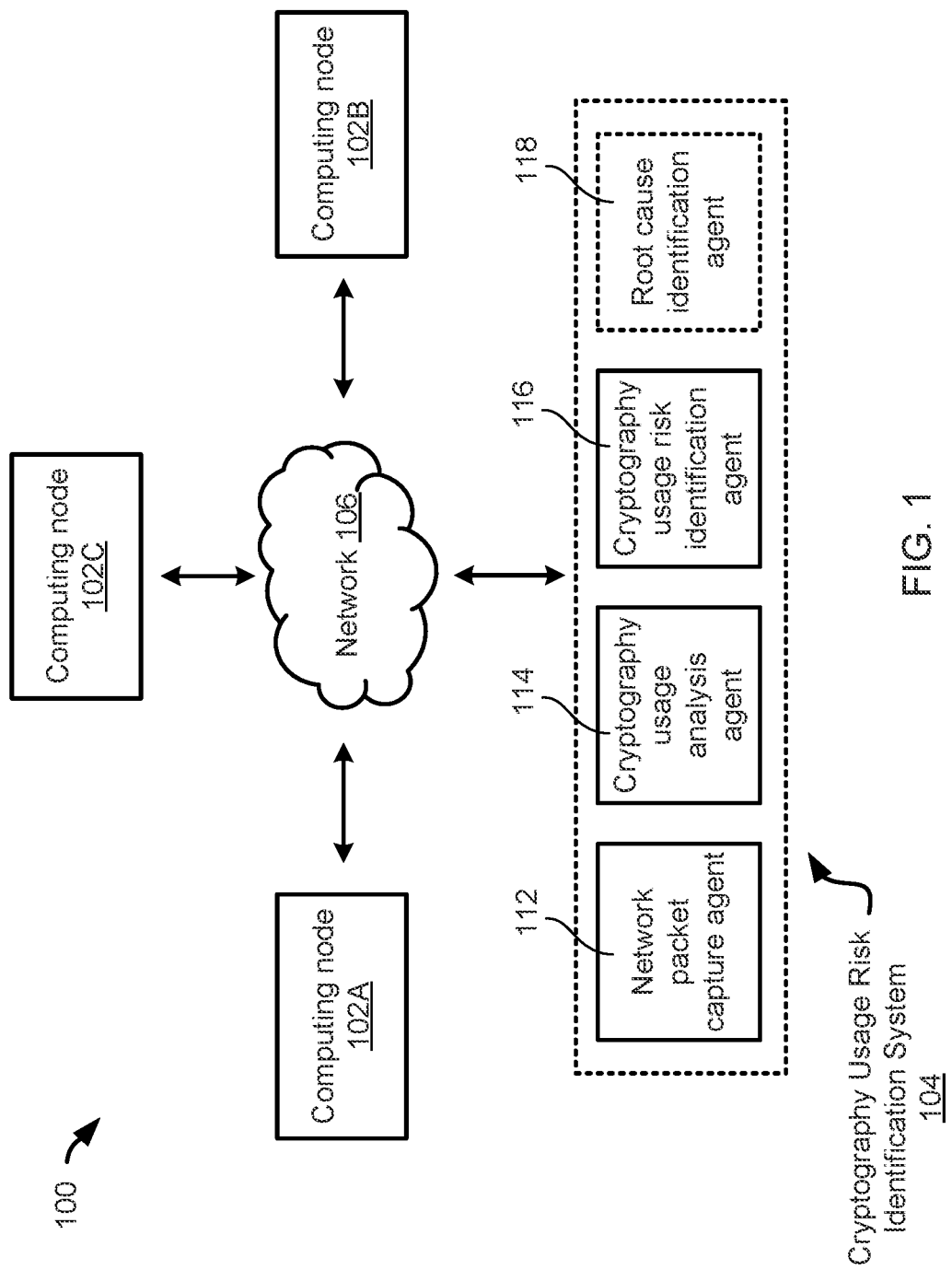
FIG. 1 is a block diagram of an example communication environment.

In some aspects of what is described here, a cryptography usage risk identification system is used to identify risks in cryptography used in network communication between computing nodes. Use of risky cryptography may allow an attacker to impersonate critical systems or read and alter confidential data, posing critical risks to information technology (IT) security. Such risks evolve over time. In some instances, a cryptography usage risk identification system is configured to examine network traffic, evaluate in-use cryptography and protocols, and produce output that identifies the specific network endpoints that are participating in cryptographically risky communication. In some instances, a cryptography usage risk identification system is also configured to identify the specific applications on the identified network endpoints participating in risky communication. In some instances, a cryptography usage risk identification system may also be configured to identify root causes for risky communication in the identified applications.

In some instances, cryptography usage risks that can be identified by the methods and systems presented here may include plain text for capture, weak ciphers which enable attacker to decrypt, weak keys used which may enable attacker to decrypt, weak keys used which may enable attacker to impersonate network entities, broken protocols which may allow known attacks, weak hash for integrity checks which may enable simpler forgeries, non-standard/pre-standard usage, non-compliance with organizational policy, overuse of computing resources with cryptography that is too strong, misused combinations of ciphers or protocols—against current recommendations which may promote other attacks, and other types of risks. Note that weak ciphers, keys or hash may be currently broken (e.g., key is so weak it is practically not there); may be weak by today's standards (e.g., probably solvable with current computing power); or may be strong by today's standards—but weak or broken under a quantum computer.

Aspects of the present disclosure provide advantages and improvements over existing technologies. For example, the methods and techniques presented here can identify vulnerabilities in encryption protocols and algorithms, unauthorized access, data breaches and other malicious activities, and help to bolster the overall security of the network communication. The methods and techniques presented here can improve data confidentiality by identifying risky cryptography used and ensuring that proper cryptography is used in data exchange, so as to protect sensitive information from potential leaks and tampering or manipulation. Furthermore, the methods and techniques presented here can efficiently identify a variety of complex cryptography usage and implementation instances, and can ensure that the communication environment remains resilient to advanced and evolving threats. In some cases, a combination of these and potentially other advantages and improvements may be obtained.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptography systems, for example, making them more secure, more efficient or providing other advantages in some instances.

FIG. 1 is a block diagram showing aspects of an example communication environment 100. The example communication environment 100 shown in FIG. 1 includes three computing nodes 102A, 102B, and 102C and a cryptography usage risk identification system 104. The cryptography usage risk identification system 104 can be deployed on one or more of the computing nodes 102A, 102B, and 102C, on other computing resources in the communication environment 100, or a combination of them. In some implementations, the cryptography usage risk identification system 104 is configured to examine network traffic and identify cryptography usage risks associated with the network traffic. In the example shown in FIG. 1, the computing nodes 102A, 102B, and 102C communicate with each other over a network 106, and each of the computing nodes 102A, 102B, 102C are distinguishable from one another in the communication environment 100. For example, each of the computing nodes 102A, 102B, 102C may include a unique identifier, e.g., an IP address, a MAC address, etc. The communication environment 100 may include additional or different features, and the components in a communication system may be configured as shown in FIG. 1 or in another manner. For example, the communication environment 100 may include additional computing nodes and the network 106 may include physical or virtual components.

In some implementations, the computing nodes 102A, 102B, and 102C in the communication environment 100 have a server-client relationship. For example, the computing node 102C can be a server and the computing nodes 102A, 102B can be its client in the network, or vice-versa. In some implementations, the computing nodes 102A, 102B, and 102C in the communication environment 100 may have a peer-to-peer relationship. Nodes may have another type of relationship in the communication environment 100.

In the example shown in FIG. 1, the example computing nodes 102A, 102B, and 102C, each have computational resources (e.g., hardware, software, and firmware) that are used to communicate with other nodes. For example, each of the nodes in the communication environment 100 shown in FIG. 1 may be implemented as the example computer system 900 shown in FIG. 9 or components thereof. In some implementations, the nodes in the communication environment 100 can be implemented in various systems, such as, for example, laptops, desktops, workstations, smartphones, tablets, servers, server clusters, mainframes, and other types of computer systems. In some cases, a single device may operate both as an entity node and as a certificate authority node.

In the example shown in FIG. 1, the computing nodes 102A, 102B, and 102C may correspond to a computing device, a computer system, an IP address or other network address, or another type of computer-readable identifier or instance of a computer resource. Accordingly, the computations and other operations of each entity may be performed by one or more processors or other elements of the respective node. Similarly, information sent to or received by an entity may be sent to or received by an element (e.g., one or more processors, memories, or interfaces) of the respective node.

The example network 106 can include all or part of a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In some instances, the computing nodes 102A, 102B, and 102C shown in FIG. 1 may communicate with each other in a secure manner using one or more cryptography systems. For instance, the nodes may utilize a cryptography system in the context of a public key infrastructure (PKI) or otherwise.

In some cases, the computing nodes 102A, 102B, and 102C use a digital signature scheme that allows each node to validate the authenticity of messages received from the other node. The digital signature scheme can be, for example, an elliptic curve cryptography (ECC) based signature scheme, an RSA-based signature scheme, a lattice-based signature scheme, a hash-based signature scheme, a supersingular isogeny-based signature scheme, a multivariate signature scheme or a scheme that uses another type of cryptography. When a digital signature is verified using the signer's public key, the verifier may establish trust in the signer's public key based on a digital certificate or another type of mechanism.

In some cases, the computing nodes 102A, 102B, and 102C use a key establishment technique by which two or more parties establish a shared secret key. In some cases, the shared secret key can then be used for cryptographic communications, for example, to encrypt and decrypt messages, ensuring that only the intended recipient can read them. Examples of key establishment techniques include key agreement, key encapsulation, and key transportation. In some instances, a key establishment technique includes a Diffie-Hellman key exchange, elliptic curve Diffie-Hellan key exchange, Secure Shell (SSH), Transport Layer Security (TLS) and other techniques. In some implementations, a key establishment technique can provide advantages including confidentiality, authenticity, and integrity.

In some implementations, one or more of the computing nodes 102A, 102B, 102C can be implemented as a host system that primarily runs or manages containerized applications. In certain instances, the computing node 102C may be a physical or virtual machine that hosts container platforms which manages the containers on the computing node 102C.

In the example shown in FIG. 1, the cryptography usage risk identification system 104 is configured to capture traffic, evaluate cryptography usage risk, and identify applications associated with the cryptography usage risks. In some implementations, the cryptography usage risk identification system 104 can be applied to any standard network protocol, including TLS, HTTP, DNS, SMTP, IMAP, POP3, DTLS, SSH, and IKE. This list can be extended at any time for any standard or proprietary protocol, new or existing. In some instances, the network traffic being observed by the cryptography usage risk identification system 104 is encapsulated, for example using the General Routing Encapsulation (GRE) tunnelling protocol, or Virtual Extensible LAN (VXLAN) network virtualization.

In some instances, the cryptography usage risk identification system 104 includes various modules and agents. As shown in FIG. 1, the cryptography usage risk identification system 104 includes a network packet capture agent 112, a cryptography usage analysis agent 114, and a cryptography usage risk identification agent 116. In certain instances, modules and agents of the cryptography usage risk identification system 104 may be co-located on a single computing node. In this case, each of the components or agents of the cryptography usage risk identification system 104 may communicate directly with other computing nodes to receive or transfer information. For example, the cryptography usage risk identification system 104 may be hosted on the computing node 102C. In some instances, the cryptography usage risk identification system 104 may be implemented as the cryptography usage risk identification system 720 in FIG. 7A or in another manner.

In some other instances, modules and agents of the cryptography usage risk identification system 104 may be distributed onto multiple computing nodes within the communication environment 100. Distributed agents of the cryptography usage risk identification system 104 may communicate with one another through the network 106. For example, modules and agents of the cryptography usage risk identification system 104 may be separately hosted on two or more of the computing nodes 102A, 102B, 102C or other computing nodes within the communication network 100. In some instances, the cryptography usage risk identification system 104 may be implemented as the cryptography usage risk identification system 720 in FIGS. 7B-7E, or in another manner.

Figure 2:
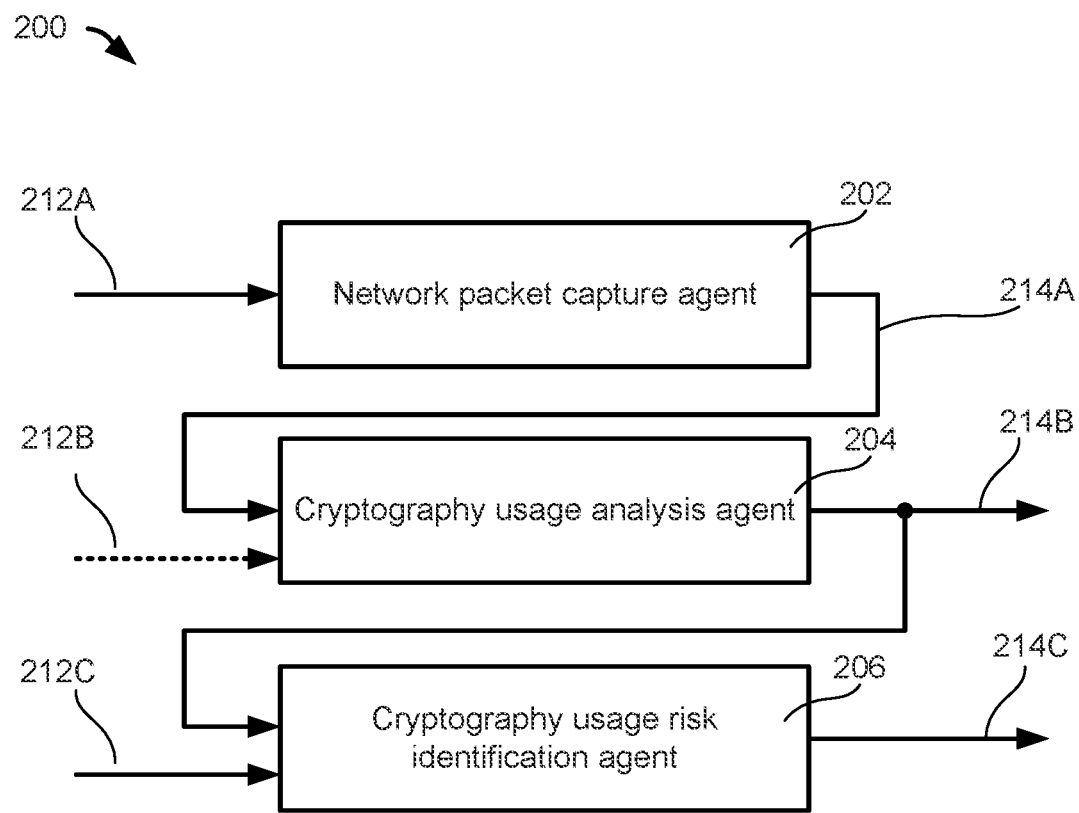
FIG. 2 is a block diagram showing aspects of an example system for identifying cryptography usage risks.
Figure 8:
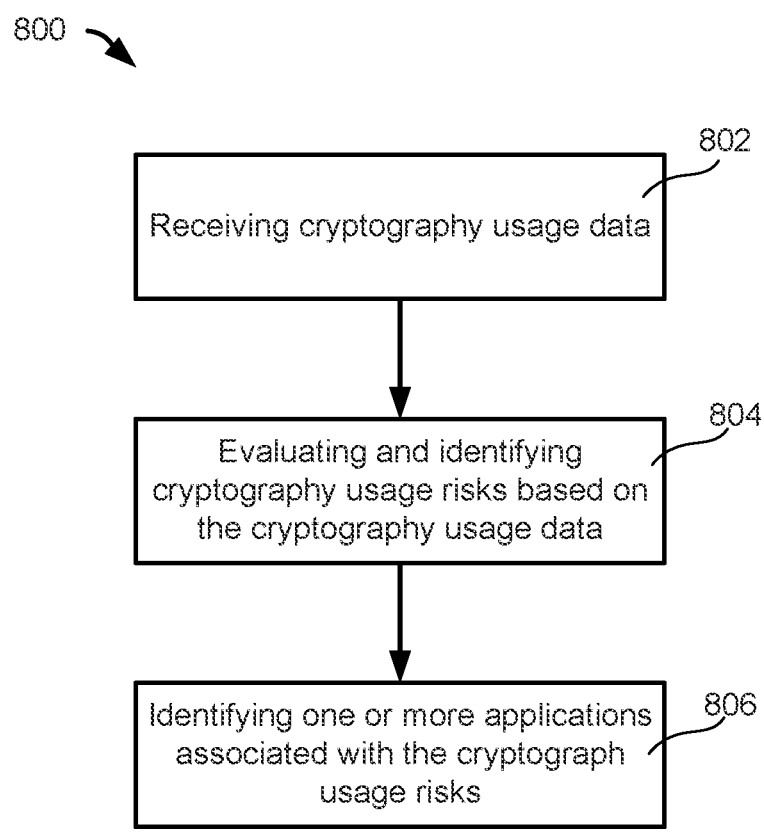
FIG. 8 is a flow chart showing an example process for identifying cryptography usage risks.

In some implementations, the cryptography usage risk identification system 104 is implemented as the cryptography usage risk identification system 200 shown in FIG. 2 and operated according to the operation in the example process 800 shown in FIG. 8. In some implementations, the network packet capture agent 112 is configured to receive network data and to determine cryptography usage data; the cryptography usage analysis agent 114 is configured to receive the cryptography usage data determined by the network packet capture agent 112 and potentially other data to determine cryptography usage risks; and the cryptography usage risk identification agent 116 is configured to receive the determined cryptography usage risks from the cryptography usage analysis agent 114 and potentially other data to identify one or more applications associated with the determined cryptography usage risks. In some implementations, the components of the cryptography usage risk identification system 104 may be implemented as the respective agents shown in FIGS. 2 and 3-6.

In some instances, the cryptography usage risk identification system 104 may include other modules or agents. For example, the cryptography usage risk identification system 104 may include a root cause identification agent 118 (e.g., the root cause identification agent 600, 728 in FIGS. 6, 7B-7E). The root cause identification agent 118 may be configured to receive the determined cryptography usage risks from the cryptography usage analysis agent 114 and the identified application information from the cryptography usage risk identification agent 116 and potentially other data to determine one or more actionable root cause of the cryptography usage risks. In this case, the cryptography usage risk identification system 104 may also be configured to identify root causes for risky communication in the identified applications. In some instances, the cryptography usage risk identification system 104 may be further configured to identify root causes of risky cryptography usage. For another example, the cryptography usage risk identification system 104 may include an active probe agent (e.g., the active probe agent 730 in FIGS. 7D-7E).

FIG. 2 is a block diagram showing aspects of an example cryptography usage risk identification system 200. The example cryptography usage risk identification system 200 includes multiple agents with respective inputs and outputs. In particular, the example cryptography usage risk identification system 200 includes a network packet capture agent 202, a cryptography usage analysis agent 204, and a cryptography usage risk identification agent 206.

In certain examples, the network packet capture agent 202, the cryptography usage analysis agent 204, and the cryptography usage risk identification agent 206 may be located on a primary container host, a single computing node, or an endpoint of a communication network. In some other examples, the network packet capture agent 202, the cryptography usage analysis agent 204, and the cryptography usage risk identification agent 206 may be separately located on different computing nodes or endpoints. Agents may perform operations locally on the respective computing nodes; and further communicate information to one another through the communication network. For example, network packet capture agent 202 may be deployed and connected directly to an appliance such as a router to receive encapsulated traffic; to sniff a network directly; or to decode a third-party packet capture. For example, the cryptography usage risk identification agent 206 can be installed locally on a system of interest or installed and perform operations on the primary container host distinct from the system of interest.

In some instances, the example cryptography usage risk identification system 200 may include other components, and the components in a cryptography usage risk identification system may be configured as shown in FIG. 2 or in another manner. For example, the example cryptography usage risk identification system 200 may include an active probe agent (e.g., the active probe agent 730 in FIG. 7). In some instances, the active probe agent may be installed locally on the system of interest (e.g., a physical or virtual machine) or installed on the primary container host to remotely perform operations (e.g., remote file access) on the system of interest.

As shown in FIG. 2, the network packet capture agent 202 is configured to receive network data at a first input 212A and to determine cryptography usage data which can be output at a first output 214A. In certain instances, the first input 212A is received from the communication network (e.g., live network, encapsulated network, etc.); and may include packet capture files. In some instances, the first output 214A may be communicated to the cryptography usage analysis agent 204 and used to determine cryptography usage risks. In some implementations, the network packet capture agent 202 may be implemented as the network packet capture agent 300 in FIG. 3 or in another manner.

In some implementations, the network packet capture agent 202 is configured to capture network packets; extract communication metadata of communications that follow any protocols of interest; and determine cryptography usage data based on the extracted communication metadata. In some implementations, the extracted communication metadata may include protocol-specific handshake or parameter negotiation data, from which communication usage data is extracted. The extracted communication metadata may further include MAC address, IP address and port of each endpoint of a communication, and other information. The cryptography usage data may include protocol, protocol version in use on a respective communication, negotiated cryptographic algorithms, cryptographic parameters, and other information. Protocols include secure protocols such as Transport Layer Security (TLS), Secure Shell (SSH), etc. that involve cryptographic algorithm and parameter negotiation, as well as insecure (plaintext) protocols such as Hypertext Transfer Protocol (HTTP) and Domain Name System (DNS). In some instances, the protocol versions for different protocols include TLS 1.0, TLS 1.1, TLS 1.2, TLS 1.3 for TLS, SSL 2.0, SSL 3.0 for SSL, and other protocol versions for other protocols. In some instances, the cryptographic algorithms include symmetric-key algorithms, asymmetric algorithms, hashing algorithms, and other cryptographic algorithms. In some instances, the cryptographic parameters for different cryptographic algorithms include key size, block size and initialization vector for symmetric-key algorithms, key size, elliptic curve parameters or other parameter set identifiers for asymmetric algorithms, output size and hash function for hashing algorithms, and other parameters for other cryptographic algorithms. The cryptographic parameters for the lattice-based PQC algorithms include a "parameter set identifier", which corresponds to a specific set of values as defined in standards documents or in another manner. In some instances, the cryptographic parameters may be expanded at any time to include parameters used in new, or newly standardized algorithms.

In some implementations, the cryptography usage analysis agent 204 is configured to receive the cryptography usage data determined by the network packet capture agent 202 and potentially other data on a second input 212B; and to determine and output cryptography usage risks on a second output 214B. In some instances, the second input 212B may be received from a user through an interface, a database stored in a local or remote memory unit, or in another manner. In some implementations, the cryptography usage analysis agent 204 may be implemented as the cryptography usage analysis agent 400 in FIG. 4 or in another manner.

In some implementations, the cryptography usage analysis agent 204 is configured to receive the extracted cryptography usage data from the network packet capture agent 300 and analyses the security of each communication based on the cryptography usage data and predetermined criteria. The analysis may include examination of the strengths of the cryptographic algorithms and parameter choices, the protocol and protocol version used. Communications that are using bad cryptography are identified, as well as communications that are not using cryptography. Note that such cryptographic risk may include future risks. In other words, protocols and algorithms that are secure today but may be broken in the future. From the analysis, a cryptographic risk score can be determined by the cryptography usage analysis agent 400; can be associated with a subset of the captured packets from a respective communication; and stored together with the cryptography usage data. In some instances, the second output 214B of the cryptography usage analysis agent 204 may also include a cryptography inventory. In some implementations, the cryptography inventory is created, by operation of the cryptography usage analysis agent 204, based on the cryptography usage data; and the cryptography inventory includes at least part of the cryptography usage data (e.g., IP addresses, operation systems, protocol, cryptographic algorithms, associated cryptography usage risks, etc.). In some instances, the cryptography inventory is created by distilling the cryptography usage data, removing redundancies in the cryptography usage data (e.g., same computing nodes communicating using the same cryptographic protocol/algorithm at different times), categorizing, and reorganizing the cryptography usage data according to different criteria. In some cases, the criteria to create the cryptography inventory can be customized, changed, or otherwise modified.

In some instances, the cryptography usage analysis agent 204 may further receive information from other agents of the cryptography usage risk identification system 200 on the second input 212B. For example, the cryptography usage analysis agent 204 may receive cryptography usage risks from the cryptography usage risk identification agent 206. In this case, the received cryptography usage risks received from the cryptography usage risk identification agent 206 (e.g., on the third output 214C) may be included into the output of the cryptography usage analysis agent 204 as part of the cryptographic inventory. For example, the cryptography usage analysis agent 204 can receive communication metadata from an active probe agent (e.g., the active probe agent 730 of the cryptography usage risk identification system 720 in FIG. 7E). In this case, the communication metadata from an active probe agent similar to the communication metadata from the network packet capture agent 202 can be used to determine the cryptography usage data. In some other examples, the cryptography usage analysis agent 204 may communicate with other agents of the cryptography usage risk identification system 200 in another manner.

In some implementations, the network packet capture agent 202 and the cryptography usage analysis agent 204 are configured to identify cryptography usage, cryptographic algorithms and parameter values, and protocols used in the communication network (e.g., between endpoints of a client's information network). When one or more cryptography usage risks are identified by the cryptography usage analysis agent 204, the cryptography usage risk identification agent 206 of the cryptography usage risk identification system 200 receives the determined cryptography usage risks and the cryptographic inventory from the cryptography usage analysis agent 204 and application network connectivity information on a third input 212C to identify one or more applications associated with the determined cryptography usage risks. In some instances, the application network connectivity information is obtained from other computing nodes or endpoints within the communication environment. In some instances, application cryptographic risk information about the determined one or more applications associated with the identified cryptography usage risks may be communicated to other agents of the cryptography usage risk identification system 200 and used to further determine root causes of the cryptography usage risks. In some implementations, the cryptography usage risk identification agent 206 may be implemented as the cryptography usage risk identification agent 500 in FIG. 5 or in another manner.

In some instances, the cryptography usage risk identification system 200 includes other agents. For example, the cryptography usage risk identification system 200 may include a root cause identification agent configured to receive the determined cryptography usage risks and the cryptographic inventory from the cryptography usage analysis agent 204 and the application cryptographic risk information from the cryptography usage risk identification agent 206 to determine one or more actionable root causes of the cryptography usage risks. The cryptography usage risk identification agent 206 can generate one or more actionable root causes of the cryptography usage. In some instances, the root cause identification agent may further receive data from one or more scanners. For example, the root cause identification agent may receive scanner data from a source code analysis module, a certificate scanner module, a software library scanner module, or other scanner modules. In some implementations, the root cause identification agent may be implemented as the root cause identification agent 600 in FIG. 6 or in another manner. The root cause identification agent may be installed on the primary container host and configured to remotely analyze the system of interest; or installed locally on the system of interest to perform operations, e.g., coordinating with scanners, obtaining scanner results, and communicating the scanner results back to the primary container host.

Figure 3:
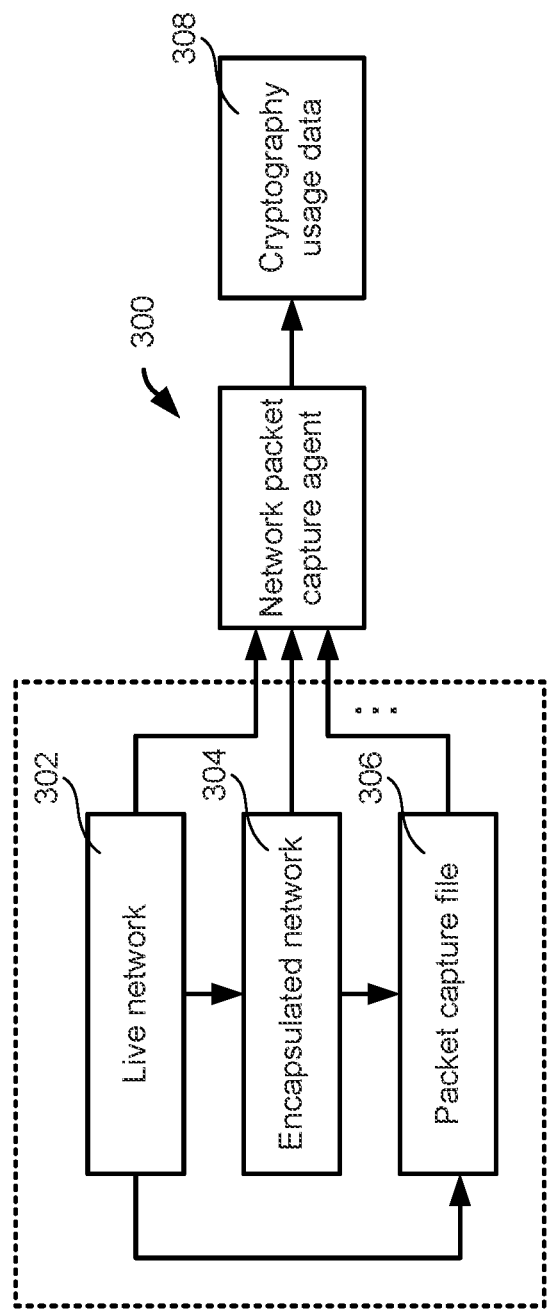
FIG. 3 is a block diagram of an example network packet capture agent.

FIG. 3 is a block diagram showing aspects of an example network packet capture agent 300. The example network packet capture agent 300 may be part of a cryptography usage identification system (e.g., the cryptography usage identification system 104, 200, 720 in FIGS. 1, 2, 7A-7E). The network packet capture agent 300 is configured to capture network packets communicated by computing nodes within the network environment, extract communication metadata from the captured packets; and to determine cryptography usage data based on the communication metadata from the captured packets. In some instances, the example network packet capture agent 300 may capture traffic that does not use cryptography. The example network packet capture agent 300 is configured to capture traffic at any location in the network, depending on what portion of the network is targeted for analysis. In some instances, the network packet capture agent 300 may be configured to perform other operations.

In some instances, the example network packet capture agent 300 may be configured on an internal subnet behind any gateway devices, so that traffic from individual endpoints (e.g., the computing nodes 102A, 102B, 102C) on that subnet is seen as originating from the endpoints rather than being masked by a router, a switch, a load balancer, or other similar infrastructure. The example network packet capture agent 300, under this configuration, is enabled to have visibility into traffic internal to a network zone.

In some instances, the example network packet capture agent 300 may be configured in one or more cloud computing systems, so that traffic involving individual cloud computing systems is seen as originating from the respective cloud computing systems, rather than being collectively viewed as a single abstract endpoint. This configuration may allow the example network packet capture agent 300 to view traffic exchanged between multiple endpoints within the cloud computing environment. In some instances, the multiple endpoints participating in the communication may be identified by attributes in the captured network packets, such as IP addresses, MAC addresses, or supplemental data such as network segment.

In some instances, the example network packet capture agent 300 may be configured behind a load balancer, so that the captured data contains data identifying the specific endpoint participating in the communication. This configuration may allow the example network packet capture agent 300 to capture data that is unique to the individual members of a load balanced collection.

In some instances, multiple instances of the example network packet capture agent 300 may be deployed in the computing environment, simultaneously or separately, following any variety of the above example configurations, or any network topology, depending on the desired target of the analysis. The multiple network packet capture agent 300 may be installed on different physical or virtual machines.

The example network packet capture agent 300 may take optional input, for example user-entered, or configuration data, that describes what data is expected to be retained in the output. The optional input to the network packet capture agent 300 may include one or more of the following: command line parameters listing protocols of interest, a JSON configuration file identifying protocols and optional protocol versions of interest, or similar. In the absence of this optional input, the network packet capture agent 300 may have a default behavior, for example to retain data about all protocols it recognizes. The example network packet capture agent 300 may retain data required to identify the endpoints of each communication, data that identifies the protocol used for the communication, and data about cryptography used in establishing the communication. If one or more certificates are exchanged during the establishment of the communication, attributes from the certificate may be retained, as well as the certificate itself. Certificate attributes of interest may include expiration dates, subject, issuer, X.509 extensions and cryptographic attributes. The payload of the communication, for example the HTML content of a web page sent over a TLS connection, may be ignored allowing the output of the network packet capture agent 300 to be more efficient and private when compared to retaining the entirety of the captured traffic.

In some implementations, the network packet capture agent 300 is configured to serve as the initial data collection point of the cryptography usage risk identification system. It is configured to capture network packets flowing through the target network. In some instances, the network packet capture agent 300 may produce an intermediary data file, such as a pcap or pcapng file. In some implementations, the captured packets are parsed by the network packet capture agent 300 to extract the communication metadata about each communication observed in the captured packet. The extracted communication metadata may be stored in the intermediary file and then used to determine cryptography usage data which can be transferred to another agent of the cryptography usage risk identification system for further processing (e.g., the cryptography usage analysis agent 114, 204, 400 in FIGS. 1-2, and 4). In some instances, the extracted communication metadata may be directly communicated to an API of another system (e.g., the cryptography usage analysis agent 400 in FIG. 4) without being stored in an intermediary file. In some implementations, the cryptography usage data includes data from the communication metadata. For example, the cryptography usage data may include some data that is common to all types of observed communications, including but not limited to a source MAC address, a destination MAC address, a source IP address, a source port, a destination IP address, a destination port, a protocol name, a protocol version, and a transport protocol. The cryptography usage data may also include some data that is unique to the protocol being used for the communication. For example, in TLS connections, the cryptography usage data may include Server Name Indication, Ciphersuite, Key Exchange Parameter, Key Exchange Named Group, Server Certificate identifier, Client Certificate identifier, or other data. For another example, in SSH connections, the cryptography usage data may include Key Exchange Algorithm, Key Exchange Parameters, Authentication Algorithm, Authentication Parameters, Server Host Key Algorithm, or other data. In some instances, the cryptography usage data for some plain text communication, such as HTTP, might not add any protocol-specific data and only include common data.

In some instances, the network packet capture agent 300 may only run for a limited time during an observation/packet capturing period, for example, during the weeks leading up to delivery of a cryptographic inventory report. Network traffic that may have been relevant, or high value, or cryptographically risky, may take place outside of the observation period, and thus the network packet capture agent 300 is not able to capture the network traffic. Similarly, the network packet capture agent 300 may not capture a malicious actor lowering the security level by protocol negotiation when the action occurs outside the observation period or packet capturing period. In some instances, the network packet capture agent 300 may run continuously so that it is not limited by observation period.

In some instances, when the network traffic being captured encrypts some of the desired communication metadata, the communication metadata may not be available in the output of the network packet capture agent 300. In some instances, the communication metadata that needs to be extracted may be encrypted, and thus, not readable by the network packet capture agent 300. For example, in a TLS 1.3 connection, traffic is already encrypted when the server sends a certificate to the client, therefore the network packet capture agent 300 may fail to observe and extract the communication metadata that is only available in the certificate. In some instances, the network packet capture agent 300 may include one or more active probes to mitigate this issue. In some implementations, an active probe is software that may act as a client that communicates with a target server on a target port. By being the client of this communication, it may have unencrypted access to the communication metadata that is to be included in the output of the network packet capture agent 300. In some instances, example communication metadata fields may include one or more of the example fields shown below in Table 1.

TABLE 1

| Protocol | Field | Description |
|---|---|---|
| All | Timestamp | Time the communication was initiated |
| | Protocol | Protocol used for communication |
| | Source IP | IP address of client |
| | Source Port | Port from which the communication originated |
| | Destination IP | IP address of server |
| | Destination Port | Port on which server is accepting communication |
| | Encapsulation | Indicator of network encapsulation used in the communication |
| | VNI | Network identifier |
| TLS | TLS Version | Version of TLS protocol used |
| | SNI | Server Name Indication |
| | Ciphersuite | Identifier of TLS ciphersuite used |
| | KEX Parameter | Identifier of key exchange parameter used |
| | KEX Named Group | Identifier of key exchange named group used |
| | Server Certificate Chain | Identifier of certificate(s) sent from server to client |
| | Client Auth | Indicator of client authentication being required or not |
| | Client Certificate Chain | Identifier of certificate(s) sent from client to server |
| | Compressed | Indicator of compression being used |

Figure 4:
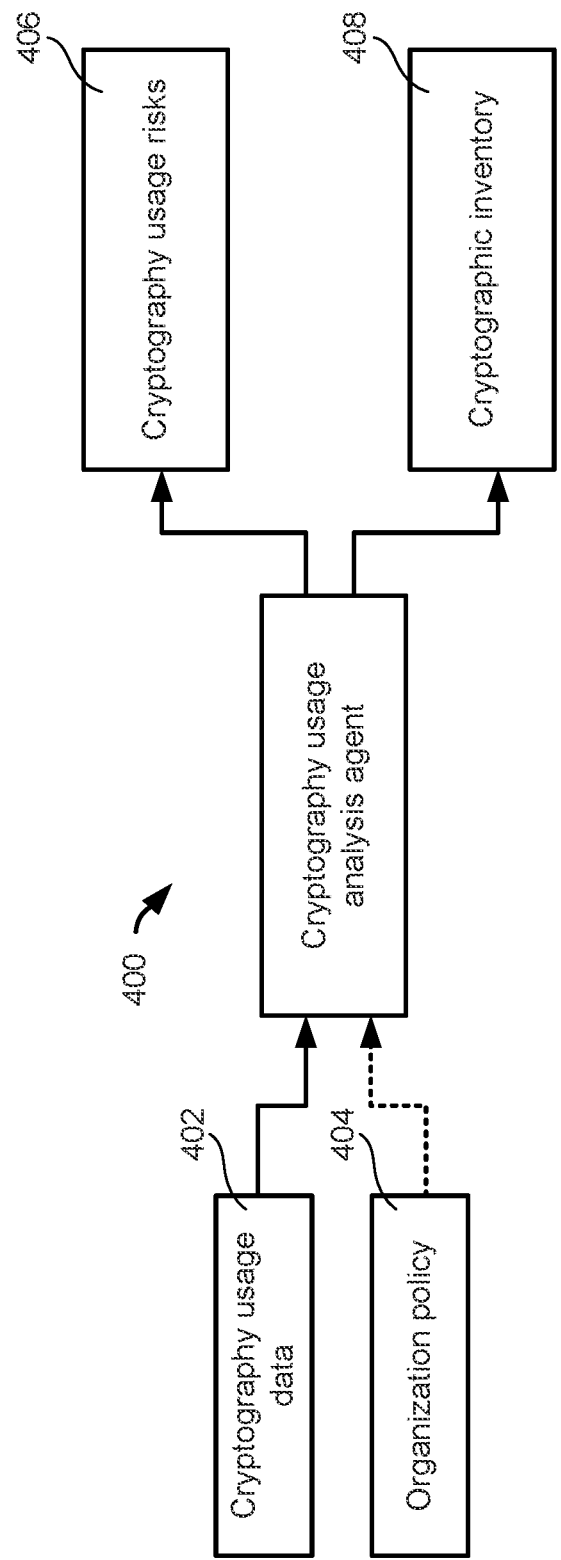
FIG. 4 is a block diagram of an example cryptography usage analysis agent.

FIG. 4 is a block diagram showing aspects of a cryptography usage analysis agent 400. In some instances, the cryptography usage analysis agent 400 may be implemented as the cryptography usage analysis agent 114, 204, 724 in FIGS. 2, 7B-7D, or in another manner. In some implementations, the cryptography usage analysis agent 400 receives the cryptography usage data 402 from a network packet capture agent (e.g., the network packet capture agent 300 in FIG. 3). As shown in FIG. 4, the cryptography usage analysis agent 400 may receive data from other input when determining the cryptography usage risks. For example, the cryptography usage analysis agent 400 may receive organization policy 404 or other configuration data based on user input. In some instances, the cryptography usage analysis agent 400 may also receive communication metadata from one or more active probes (e.g., as part of the network packet capture agent 300 in FIG. 3 or the active probe agent 730 in FIG. 7), the cryptography usage analysis agent 400 analyzes the cryptography usage data and potentially other communication metadata; and identifies cryptography usage risks for respective network endpoints participating in the communication. In some instances, the cryptography usage analysis agent 400 evaluate the cryptography usage data associated with the communication; and determines the cryptography usage risks based on the protocol type, protocol version, cryptographic algorithm, cryptographic parameters, and other data in the cryptography usage data.

In some instances, the cryptography usage data from the network packet capture agent 202 may be in a format of a file, a collection of files, imported into the cryptography usage analysis agent 400 through a user interface, or it may receive it programmatically through an Application Programming Interface (API). In some implementations, the protocol type, protocol version, cryptographic algorithm, cryptographic parameters, and other data in the cryptography usage data may be evaluated based on predetermined criteria.

In some implementations, the cryptography usage analysis agent 400 is configured to examine the received cryptography usage data and identify security characteristics about each communication that was observed by the network packet capture agent 300. Security characteristics of a communication may include the protocol, protocol version, cryptographic algorithm, cryptographic algorithm parameters, and cryptographic mode of operation. For each observed communication, a cryptographic risk score is calculated. First, each security characteristic that was used in the communication is compared with configuration data stored in the cryptography usage analysis agent 400 according to predetermined criteria. A risk level of a communication can be evaluated based on the security characteristics of a communication. For example, the criteria may specify security strength of a cryptographic algorithm and parameters and known weaknesses of a cryptographic protocol or protocol version (for example, some network protocol versions such as SSLv3 are known to be broken, some signature algorithm parameters such as RSA 512 are known to be weak). Then the communication is assigned with a cryptography usage risk score. For example, a cryptography usage risk score can be determined by calculating the minimum value of the scores of all security characteristics observed to have been used in that communication. If the communication uses a network protocol that is plain text, and therefore does not include any cryptographic algorithms, it is also given a score that reflects the insecurity of the absence of cryptography. The cryptography usage risk score is stored in a storage medium, in a format of a database, a text file, or in another manner, with the communication metadata and the cryptography usage data. In some instances, the criteria may be updated, revised, or otherwise modified to allow an update to the cryptography usage risk scores for respective communications according to the update in the security characteristics of the communication. For example, new attacks may be discovered and some that were thought to be secure may become insecure. Therefore, the scoring system and the criteria used by the cryptography usage analysis agent 400 is configurable. Also, some risks may be region specific for geopolitical reasons. Such risks may be provided as user input or configuration data as part of the organization policy 404.

In some instances, the cryptography usage analysis agent 400 may take additional input, programmatically or from a user, that classifies some communications, or some endpoints, as being of high value. For example, the user may provide input via a user interface that designates all traffic between the specified source and/or destination IP addresses as high value, or that designates all traffic of a specified protocol as high value.

TABLE 2

| Type of Risk | Description | Example(s) |
|---|---|---|
| Vulnerable | Known to be breakable with current technology | RC4, MD5, RSA-512 |
| Weak | Not easily broken by current technology, but may soon be vulnerable | RSA-1024, ECDH Brainpool p160r1 |

TABLE 2-continued

| Type of Risk | Description | Example(s) |
|---|---|---|
| Misused | Not broken in all scenarios, but when used in appropriately can lead to vulnerability | TLS_ECDHE_RSA_WITH_AES_256_CBC_SHA384 |
| Non-standard | Not necessarily broken, but using non-standard cryptography may risk non-compliance with policies | RSA 2000 |
| Not recommended | Not necessarily broken, but using parameters that are stronger than recommendations may risk overuse of resources with no additional benefit | ECDHE sect571r1 |
| Strong-Quantum-broken | Strong against attacks with current technology, but known to be vulnerable to attacks by quantum computers | ECDHE secp256r1, RSA-4096 |
| Strong-Quantum-unknown | Strong against attacks with current technology, but unknown if it can withstand attacks by quantum computers | CAMELLIA-256 |
| Pre-standard | May be a risk of non-compliance, non-compatibility, or vulnerability | Dilithium 2, Kyber-512 |
| Unencrypted | No encryption used, data is not confidential, endpoints are not authenticated | HTTP, Telnet, FTP |
| Geo-political or user-defined | There is cryptography used that is not known to be mathematically broken (and therefore classified as vulnerable) but may still be considered risky due to political tension between the country of origin of the cryptography and the country of the organization assessing their risks. This may be configured more generally to designate any specific algorithms, parameters, or protocols as being risky, regardless of countries or politics. | TLS_GOSTR341112_256_WITH_KUZNYECHIK_CTR_OMAC, DNS (for example if user config specifies the DNS protocol is disallowed, requiring DoH as an alternative) |
| High-value Assets | Defined by configuration based on specific needs of the organization | RSA-2048 on high-value server 10.0.0.1. |

In some implementations, the cryptography usage risks are determined according to predefined criteria. For example, the cryptography usage risks can be determined by comparing the cryptography usage data and a table (e.g., Table 2 shown above, or another type of table). The risk types listed in Table 2 are provided as examples. The risk types may be expanded to include other types of cryptography usage risks. For example, there could be risks in the future where the first generation of quantum safe cryptography is "Strong Against First Generation Quantum Computers, Vulnerable to Attacks from Next Generation Quantum Computers" if there is some technological leap made by attackers. In this case, when a protocol or a cryptographic algorithm used in a communication is determined, the risk type associated with the protocol or the cryptographic algorithm can be identified. In some instances, the risk type may be determined in another manner. For example, the risk type may be determined or controlled by customer, end user, or pending a change in opinion on security. In some instances, the cryptography usage risks identified by the cryptography usage analysis agent 400 may include one or more of the risks in Table 2. In some implementations, criteria that are used to determine the cryptography usage risks may be updated, revised, or otherwise modified over time according to the development of cryptography algorithms. For example, the cryptography usage risks may include future risks where the cryptography being used may be secure today but may not be secure in the future, for example algorithms such as the RSA (Rivest-Shamir-Adleman) algorithm and the Elliptic Curve Digital Signature Algorithm (ECDSA) that can be broken by quantum computers. For example, technological or mathematical breakthroughs may show that an algorithm or protocol is broken which was previously believed to be secure. For example, SSL 3.0 was thought to be secure, but was discovered to be insecure in 2014. Another example: the hashing algorithm MD5 was thought to be a secure replacement for MD4, but had significant weaknesses discovered later. In some instances, the cryptography usage analysis agent 400 may receive new data or functionality, for example through software updates of configuration changes according to the organization policy 404, which will change the principals of risk evaluation for some or all of the communication metadata inputs.

In some implementations, the cryptography usage analysis agent 400 outputs the determined cryptographic usage risks 406 associated with at least a subset of the captured network packets. In some instances, the determined cryptography usage risks 406 output from the cryptography usage analysis agent 400 also includes information about the endpoints participating the communication that involves the identified cryptography usage risk and information about how the participating endpoints are communicating with one another. In some instances, the output of the cryptography usage analysis agent 400 may include other information.

In some instances, the cryptography usage analysis agent 400 may be configured to determine and/or report on the following: packets communicated using vulnerable cryptographic algorithms breakable with current technology, packets communicated using weak cryptographic algorithms breakable with future technology, packets communicated using missed cryptographic algorithms, packets communicated using non-standard cryptographic algorithms that do not comply with policies, packages communicated using unrecommended cryptographic algorithms that cause over-use of computing resources, packets communicated without using cryptographic algorithms, packets communicated using vulnerable cryptographic algorithms breakable by quantum computers; packets communicated using user-defined cryptographic algorithms, or other packets communicated in another risky manner.

In some implementations, the cryptography usage analysis agent 400 generates and reports a cryptographic inventory 408. In some implementations, the cryptography inventory 408 includes at least part of the cryptography usage data (e.g., IP addresses, operation systems, protocol, cryptographic algorithms, associated cryptography usage risks, etc.). In some instances, the cryptography inventory is created by distilling the cryptography usage data, removing redundancies in the cryptography usage data (e.g., same computing nodes communicating using the same cryptographic protocol/algorithm at different times), categorizing, and reorganizing the cryptography usage data according to different criteria. In some cases, the criteria to create the cryptography inventory can be customized, changed, or otherwise modified.

In some instances, the cryptography usage analysis agent 400 can identify and recommend proper cryptography protocols or algorithms that should have been used in a communication where packets are communicated. For example, if an HTTP connection is observed, the cryptography usage analysis agent 400 may report that the communication should use HTTPS as a cryptography-protected equivalent. In some instances, the cryptography usage analysis agent 400 can report the cryptography usage data associated with specific traffic according to the value of the traffic defined by the user as part of the determined cryptographic usage risks 406. For example, the cryptography usage analysis agent 400 can report cryptography usage data associated with high-value traffic as defined by the user. In some instances, the cryptography usage analysis agent 400 can report user specific risk identification as part of the determined cryptographic usage risks 406. For example, if there are cryptographic algorithms or parameter choices known to have been developed by an adversary (e.g., adversarial to the customer, for example due to geopolitical concerns), usage of those algorithms or parameters may be explicitly reported on.

Figure 5:
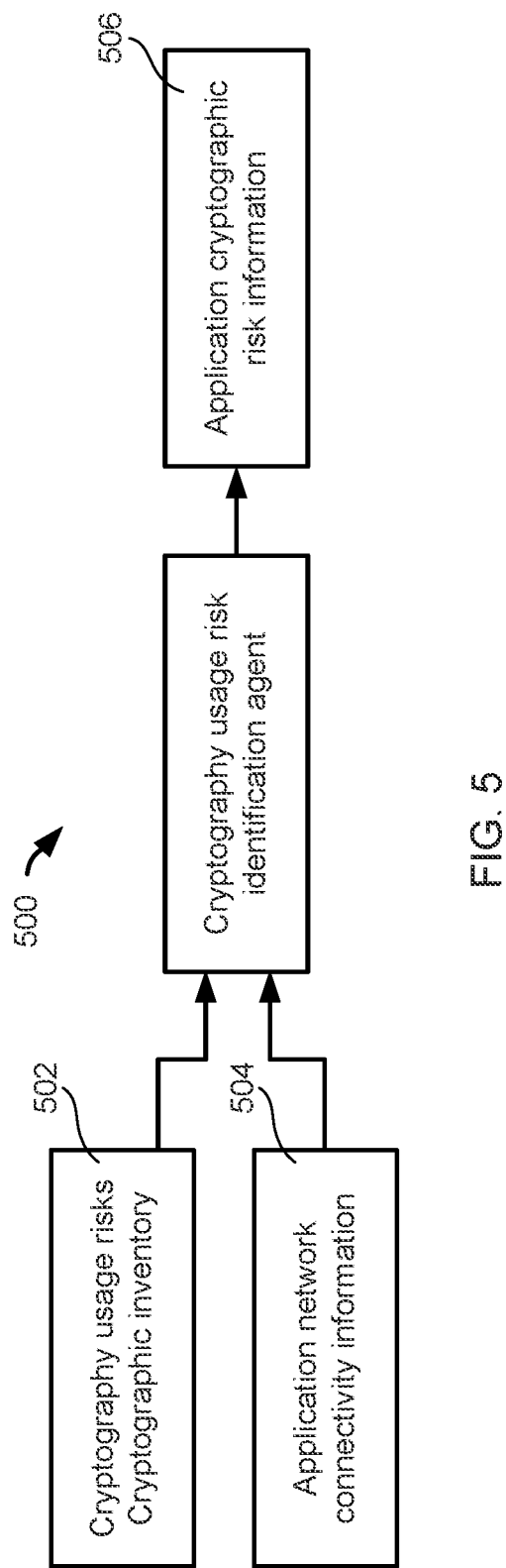
FIG. 5 is a block diagram of an example cryptography usage risk identification agent.

FIG. 5 is a block diagram showing an example cryptography usage risk identification agent 500. The cryptography usage risk identification agent 500 is configured to identify one or more applications from the endpoints that communicates the packets involving the identified cryptography usage risk identified by the cryptography usage analysis agent 400. In some implementations, the cryptography usage risk identification agent 500 receives application network connectivity information 504 extracted from endpoints involved in the risky communication. For example, each endpoint can be examined; the application network connectivity information including a list of running processes, associated application names and versions, in-use network ports can be extracted and received by the cryptography usage risk identification agent 500. In some implementations, the cryptography usage risk identification agent 500 is configured to further receive the cryptography usage data and cryptographic inventory 502 from the cryptography usage analysis agent 400; and generate application cryptographic risk information 506. In some instances, the cryptography usage risk identification agent 500 is configured to help users to plan mitigation of cryptography usage risks.

In some instances, the cryptography usage risk and cryptographic inventory 502 includes the communication metadata that can be used to uniquely identify an endpoint, such as an IP address and MAC address, as well as information about processes running on the endpoint, ports on which those processes are listening, application names that those processes belong to, and application versions. In some implementations, the cryptography usage risk identification agent 500 is configured to correlate the information observed in the captured network packets (e.g., IP addresses, MAC addresses, ports, etc. in the communication metadata) with the information in the application network connectivity information 504. For example, when the communication metadata includes a first list of ports and the application network connectivity information includes a second list of ports on which running processes or applications are accessing, the cryptography usage risk identification agent 500 compares and correlates the first and second lists of ports to identify which the software or application that is responsible for performing the risky communication. In some instances, the cryptography usage risk identification agent 500 may identify the one or more applications in another manner, e.g., by comparing and correlating other information. In some implementations, the application cryptographic risk information 506 generated by cryptography usage risk identification agent 500 includes the identified one or more applications and their associated cryptography usage risks, the identified one or more processes and their associated cryptography usage risks, and other information.

In some instances, the communication metadata used to identify the endpoints may be received via a user interface or programmatically. For each communication, the cryptography usage risk identification agent 500 identifies one or more applications responsible for the risky communication. In some instances, the cryptography usage risk identification agent 500 may, optionally, map process names to application names, for example, by querying a package management tool of an operating system on the endpoint, or by a database or data file delivered as a component of the cryptography usage risk identification agent 500. For example, the cryptography usage risk identification agent 500 can determine that a process "sshd" in the application network connectivity information is a component of the application "OpenSSH Server version 8.9". In some instances, the cryptography usage risk identification agent 500 may store its output in the database shared with the cryptography usage analysis agent 400 (e.g., by feeding the application cryptographic risk information back to the cryptography usage analysis agent 400 to generate an updated cryptographic inventory, by updating a database in a shared memory unit between the cryptography usage analysis agent 400 and the cryptography usage risk identification agent 500, or in another manner), or it may produce a report that matches the communication metadata with the identified process(es) and application(s).

Figure 6:
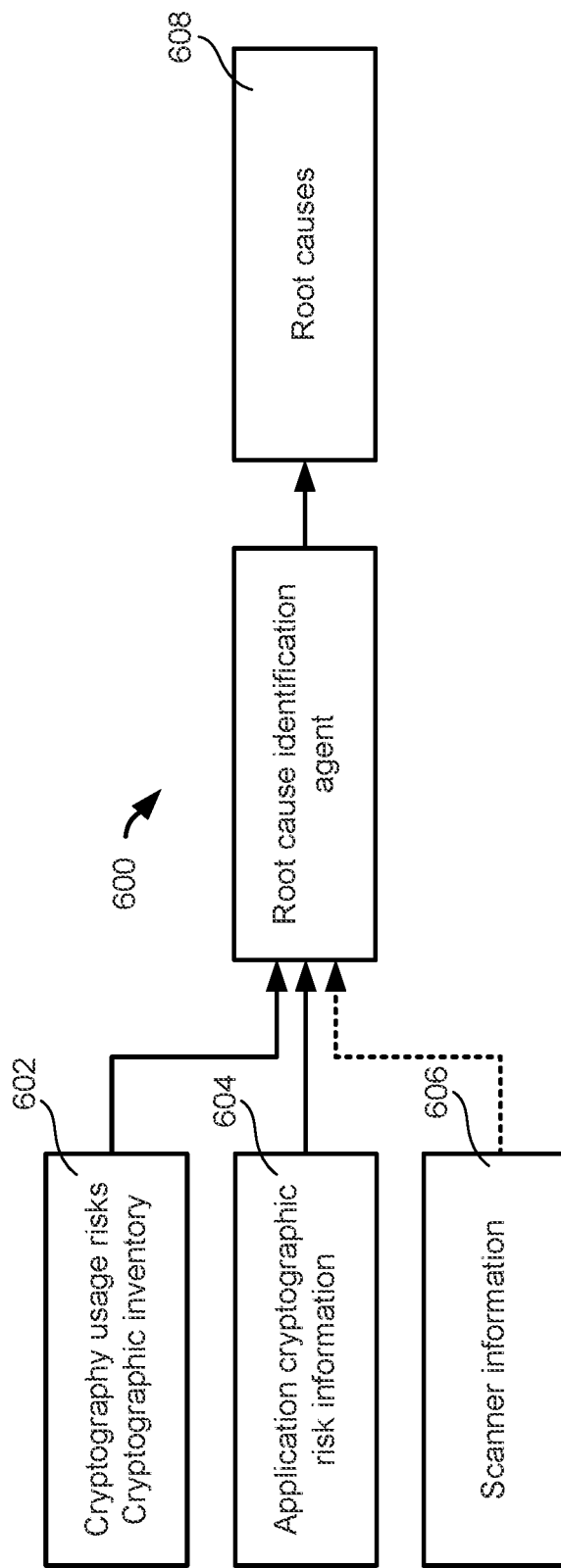
FIG. 6 is a block diagram of an example root cause identification agent.

FIG. 6 is a block diagram of an example root cause identification agent 600. The root cause identification agent 600 is configured to scan the identified endpoints or servers, and the one or more applications identified by the cryptography usage risk identification agent 500 to evaluate and determine the root cause of the cryptography usage risks. As shown in FIG. 6, the root cause identification agent 600 is configured to receive the cryptography usage risks and cryptographic inventory 602 from the cryptography usage analysis agent 400, and the application cryptographic risk 504 from the cryptography usage risk identification agent 500; and to generate one or more root causes 608.

In some instances, the root cause identification agent 600 may receive scanner information 606 from one or more scanner modules. In some instances, the example root cause identification agent 600 may be implemented as the root cause identification agent 118728 of the cryptography usage risk identification system 104, 200, 710 in FIGS. 1, 2 and 7B-7D or in another manner.

In some cases, a source code analysis module located on a different endpoint can be configured to scan source code. For example, the root cause identification agent 600 can identify that the root cause of the cryptography usage risk is because the network packet capture agent 300 is unable to observe all relevant cryptographic data, for example when encryption of the communication begins before all relevant cryptographic data has been communicated, as is the case in TLS 1.3 which begins encrypted communication before the server sends its certificate to the client.

In some implementations, the root cause identification agent 600 uses various scanning capabilities (e.g., the received scanner information 606 from one or more scanner modules) to identify root causes of the identified cryptography usage risks. In some implementations, the one or more scanner modules are configured to scan components related to each network communication. For example, components that may be scanned include processes, software, file system, and source code to identify the root cause of the cryptography usage risks. The scanning is targeted based on the identified applications associated with the identified cryptography usage risks. The choices of cryptographic algorithms and parameter values that a scanner scans for may be hard-coded or controlled by configuration files or data files. This configuration data may include some user-provided data, for example source code location, or authentication credentials.

In some implementations, the root cause identification agent 600 may be an optional component of the cryptography usage risk identification system that may be used when identifying the root cause of specified cryptographic uses is needed. In some implementations, the root cause identification agent 600 includes one or more of the following modules: a source code analysis module, a certificate scanner module, a software library scanner module, or another module.

In some instances, a source code analysis module takes as input a set of source code files, or a filesystem path to source code files, or a URI of a source code repository, or any similar means to locate source code files. In some instances, the root cause identification agent 600 may include multiple source code analysis modules in use as part of the overall system of this invention. For example, a modified version of CogniCrypt SAST may be deployed when the target source code is written in Java. Or a modified version of Pylint may be deployed to target python source code. In some instances, a source code analysis module examines each source code file to identify function calls, e.g., class instantiation, API calls, software library calls, or other function calls that are known to be used for cryptographic operations. Further analysis of the source code is performed to determine if the operation being performed by the software matches any of the security characteristics deemed to be risky, weak, or broken by the cryptography usage analysis agent. For example, the source code analysis module may analyze java source files for calls to the "java.security.KeyPairGenerator" class, and the parameters used with "KeyPairGenerator" to identify the areas of source code causing the usage of an RSA-512 key in observed traffic. Or this module may analyze python source files for calls to the "urllib3" library (or a derivative) that set the "ssl_version" parameter to "ssl.PROTOCOL_SSLv3" to identify the source code that is the root cause of a connection observed using the SSL 3.0 protocol version. In some instances, output of the source code analysis module is a report that identifies source code that may cause, or participate in, the usage of risky (or absent) cryptography. This output correlates with the application cryptographic risk information from the cryptography usage risk identification agent 500 in FIG. 5 by matching the source code to the identified application.

In some instances, a certificate scanner module examines an endpoint for X.509 certificates by scanning known certificate storage locations, including on the endpoint's filesystem, known certificate file formats, such as PEM and DER, archive files, such as zip and tar files, certificate databases, such as certdb, JKS (Java Key Store), P12 (PKCS #12), other storage facilities provided by the endpoint, such as the Windows Registry, cloud services that store certificates, such as AWS Certificate Manager, or other locations. In some instances, a certificate scanner module may take passwords, key files, tokens, or other security credentials as input, either as configuration data or from a user via a user interface. For each certificate found, the certificate scanner module can extract values from the certificate, including the signature algorithm, public key algorithm, and public key parameters, or other parameter values. In some instances, output of the certificate scanner module is a report that identifies any certificates that would cause a communication to be assessed as risky, weak, or broken by the cryptography usage analysis agent 400. Data may be correlated with communication metadata captured by the network packet capture agent 300 by matching identifying attributes of the scanned certificate with identifying attributes of the certificate observed in captured network traffic, such as a hash-based fingerprint.

In some instances, a software library scanner module examines software libraries loaded by running processes on the target endpoint. For example, on a Linux system, this module may use the "pldd" utility on a running "curl" process and examine the output for references to known cryptography implementations such as "/lib/x86_64-linux-gnu/libcrypto.so.3". The software library scanner module is configured to compare in-use software libraries with a database or data file delivered as a component of the root cause identification agent 600 that identifies the cryptographic or network protocol capabilities of known software libraries to determine if the process's use of the identified software library is the root cause, or contributing factor, of the observed risky, weak, or broken cryptography. In some instances, output of the software library scanner module is a report identifying the process and the cryptographically relevant library usage. Data may be correlated to the application cryptographic risk information from the cryptography usage risk identification agent 500 in FIG. 5.

FIGS. 7A-7E are block diagrams showing various configurations of an example cryptography usage risk identification system 720 in various computing environments 700, 740, 750, 760, 770. In some instances, the computing environments 700, 740, 750, 760, 770 may represent an internal network accessible only to authorized users. In some instances, computing nodes within the computing environments 700, 740, 750, 760, 770 and the cryptography usage risk identification system 720 may communicate with the internet, e.g., through gateways. In some implementations, the cryptography usage risk identification system 720 is configured to examine network traffic; identify cryptography usage risks associated with the network traffic; identify one or more applications associated with the cryptography usage risks; and identify one or more root causes of the identified cryptography usage risks. The example cryptography usage risk identification system 720 includes multiple agents. As shown in FIGS. 7A-7E, the example cryptography usage risk identification system 720 includes a network packet capture agent 722, a cryptography usage analysis agent 724, and a cryptography usage risk identification agent 726. The network packet capture agent 722, the cryptography usage analysis agent 724, and the cryptography usage risk identification agent 726 of the cryptography usage risk identification system 720 are implemented as the respective agents shown in FIGS. 1-5; and are operated to perform operations in the example process 800 shown in FIG. 8.

Figure 7A:
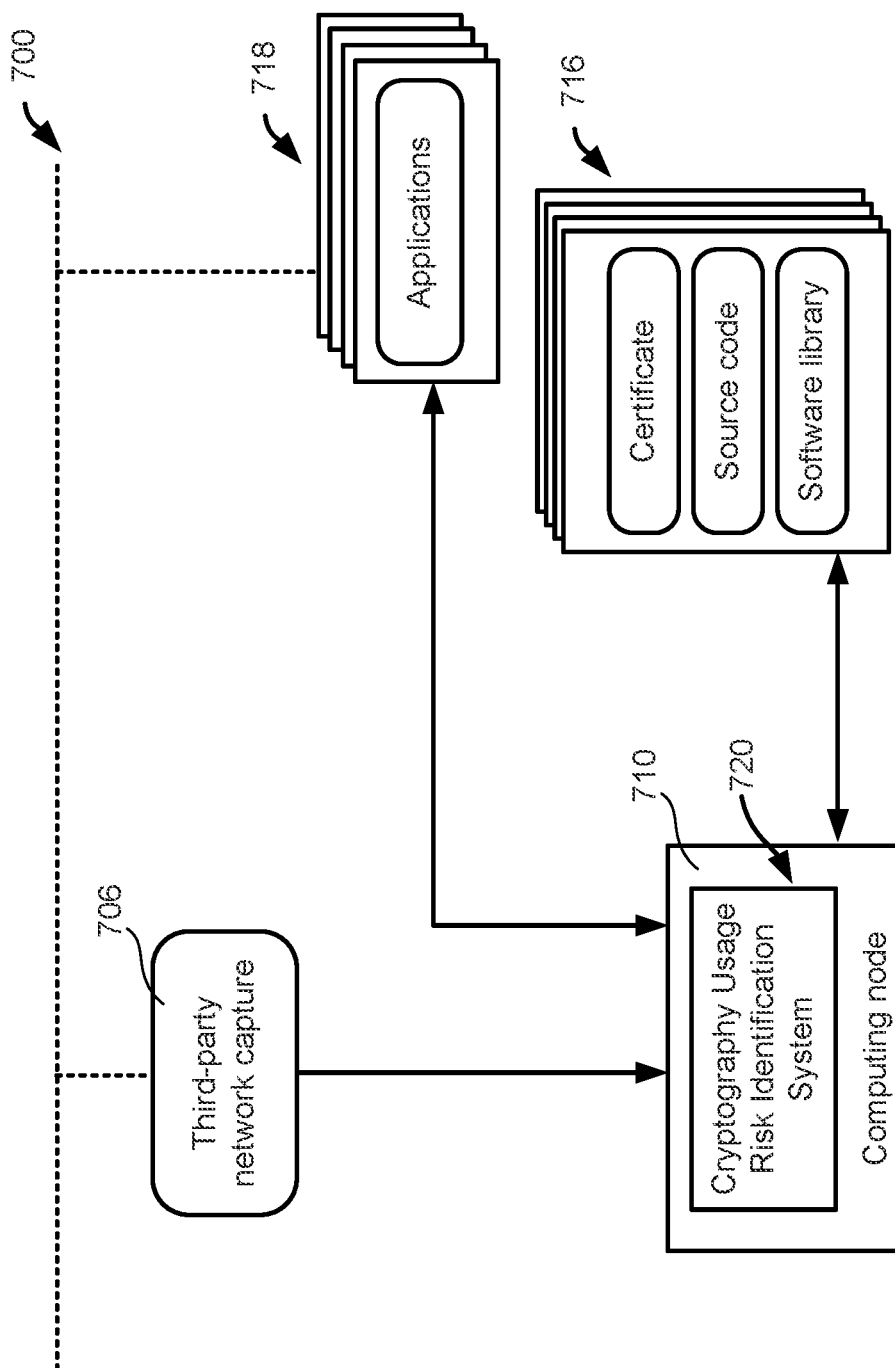
FIGS. 7A-7E are block diagrams showing various configurations of an example cryptography usage risk identification system in various computing environments.
Figure 7B:
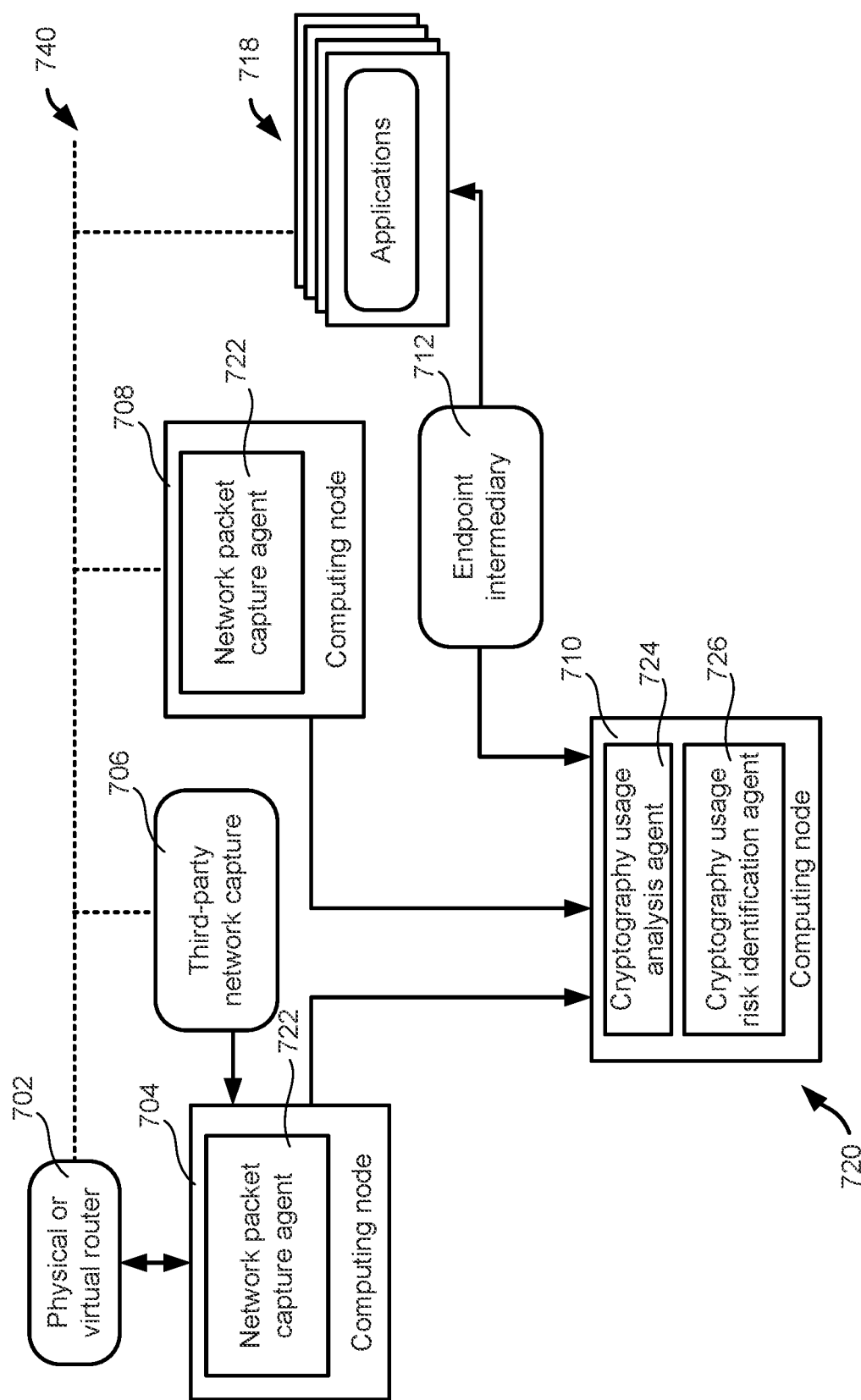
Figure 7C:
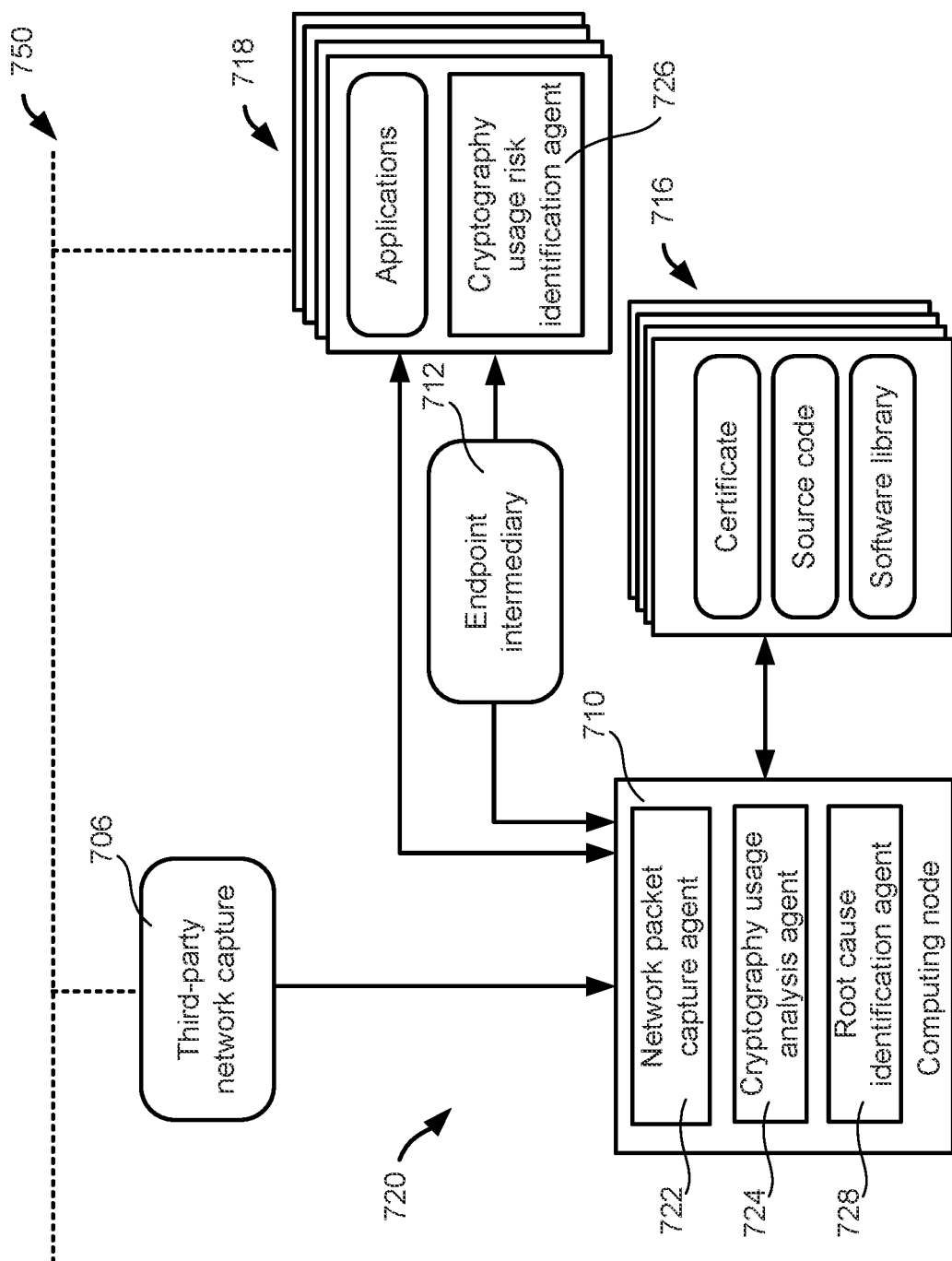
Figure 7D:
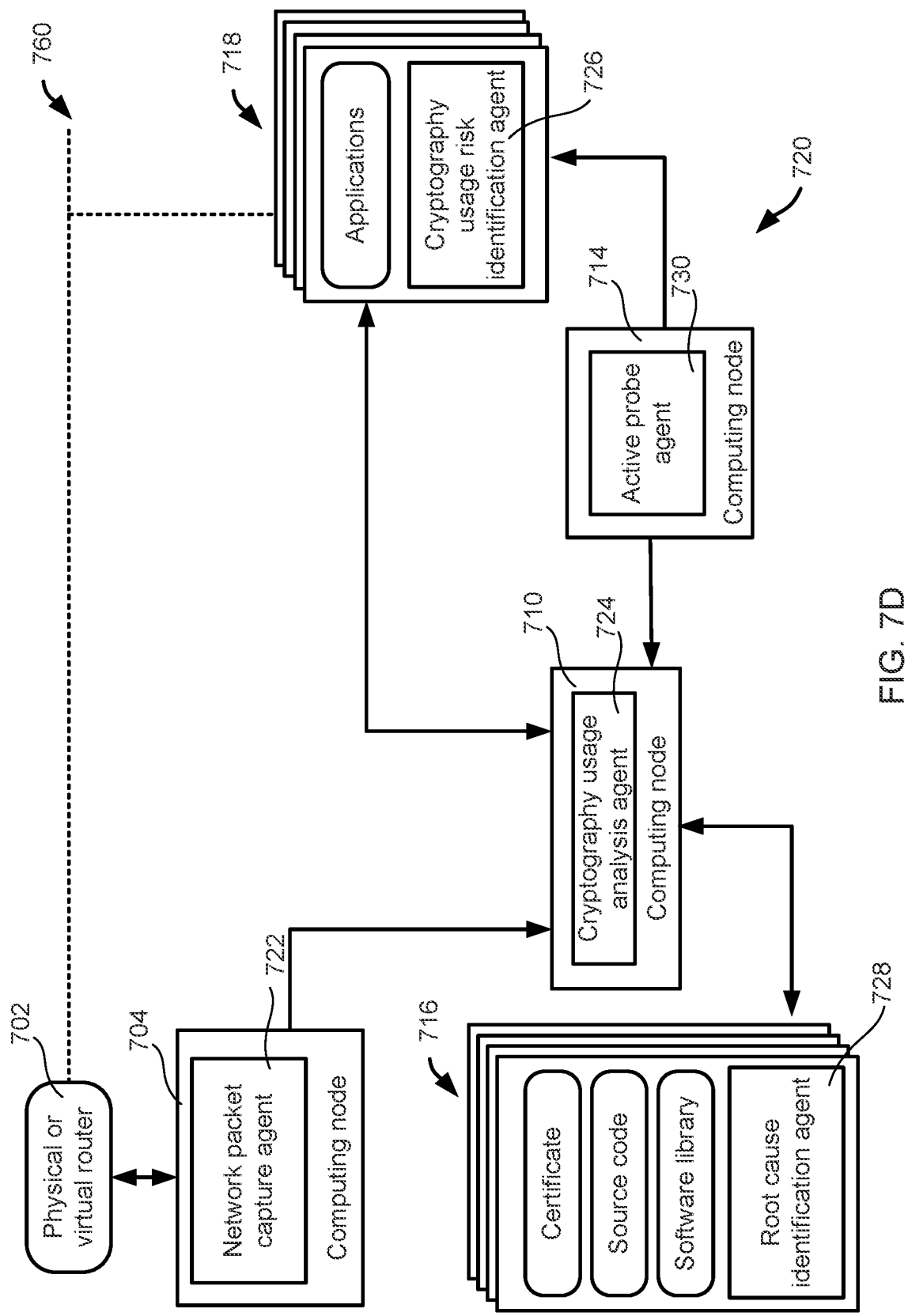
Figure 7E:
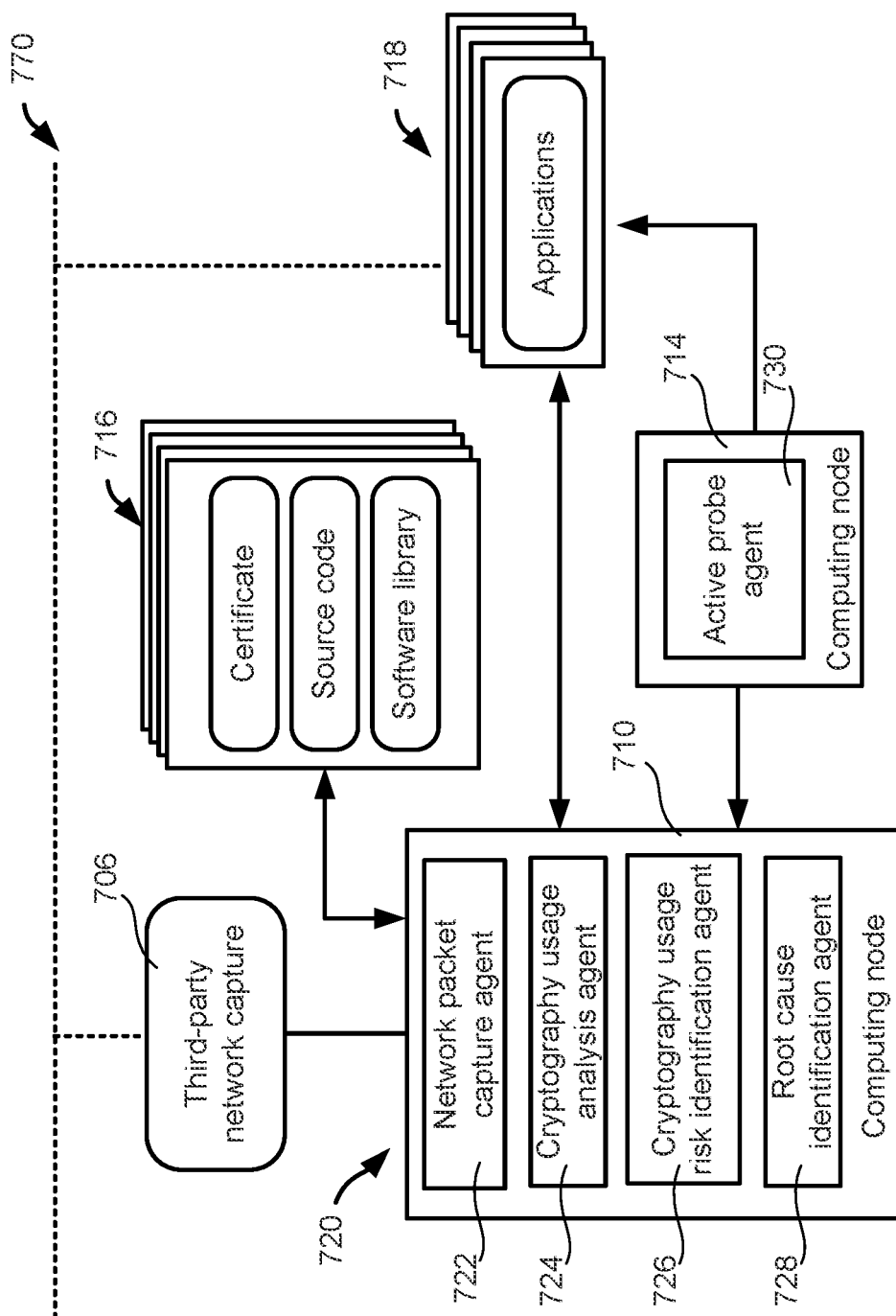

As shown in FIGS. 7C-7D, the cryptography usage risk identification system 720 includes a root cause identification agent 728, which can be implemented as the root cause identification agent 600 shown in FIG. 6. As shown in FIGS. 7D-7E, the cryptography usage risk identification system 720 further includes an active probe agent 730. In some instances, the cryptography usage risk identification system 720 may include other agents or modules which may be connected and operated in another manner.

In some instances, the active probe agent 730 may include one or more active probes. Each active probe in the active probe agent 730 is a module that performs the functionality of one endpoint in a communication. Each active probe takes configuration data as input, for example in the form of a configuration file. Based on that configuration data, the active probe initiates communication with one or more configured servers, using configurable set of parameters. In one example, a TLS active probe may take as input a list of server names and port numbers. For each server in the example, the TLS active probe may initiate a set of connections using different parameter values defining the protocol version and cryptographic characteristics of the TLS handshake. Because the active probe is one of the endpoints of the connection, rather than being a third-party monitoring packets flowing through the network, it has access to the decrypted form of any encrypted content. For example, in TLS 1.3, the TLS active probe can decrypt the encrypted certificate sent by the server and can therefore extract cryptographically relevant data from the certificate.

If there are multiple active probes in the active probe agent 730, for example if a separate active probe is implemented for each protocol of interest, the output of the active probe agent 730 may be aggregated into a single archive, or the output of each individual active probe in the active probe agent 730 may remain separate. The output of the active probe agent 730 includes metadata about each communication in which the active probe participated, whereas the output of the network packet capture agent 722 represents each communication that the network packet capture agent 722 observed. In some instances, the output of the active probe agent 730 may be used as input to the cryptography usage analysis agent 724.

In some instances, all the agents of the cryptography usage risk identification system 720 are under a centralized configuration. In other words, the agents of the cryptography usage risk identification system 720 reside together on a common computing node 710, e.g., a primary container host which could be a physical or virtual machine, to perform operations. In particular, as shown in FIG. 7A, network packets can be captured directly by the network packet capture agent 722 or received directly by the network packet capture agent 722 on the common computing node 710 from a third-party network capture module 706; cryptography usage risks are determined by operation of the cryptography usage analysis agent 724 on the common computing node 710; and application network connective information can be remotely obtained from a system of interest 718 to identify one or more applications associated with the identified cryptography usage risks. When the cryptography usage risk identification system 720 includes the root cause identification agent 728 and the active probe agent 730, the root cause identification agent 728 can analyze a system of interest 716 through a network or remote file connection to obtain scanner information which can be used to determine the root causes; and the active probe agent 730 can remotely analyze the system of interest 718.

In some instances, the cryptography usage analysis agent 724 of the cryptography usage risk identification system 720 resides on the computing node 710 and at least one other agents of the cryptography usage risk identification system 720 resides on a computing node distinct from the computing node 710. For example, as shown in FIG. 7B, the network packet capture agent 722 of the cryptography usage risk identification system 720 resides on a computing node 704 connected to a network through a physical or virtual router 702 or a computing node 708 directly connected to the network. In some implementations, the network packet capture agent 722 is operated locally on the computing node 704 or 708 to determine cryptography usage data; and to communicate the determined cryptography usage data to the cryptography usage analysis agent 724 on the computing node 710. The cryptography usage analysis agent 724 is operated to determine cryptography usage risks based on the received cryptography usage data. The cryptography usage risk identification agent 726 receives information about the cryptography usage risks from the cryptography usage analysis agent 724; obtains the application network connectivity information of the system of interest 718 via an endpoint intermediary 712; identifies one or more applications associated with the identified cryptography usage risks; and determines application cryptographic risk information which includes information about the one or more applications and the associated cryptography usage risks. In some instances, when the cryptography usage risk identification system 720 includes the root cause identification agent 728, the root cause identification agent 728 may reside on the computing node 710 (e.g., as shown in FIG. 7C); or may reside on a system of interest 716 (e.g., as shown in FIG. 7D). In some instances, the system of interest 716 may be the same as the system of interest 718 where the cryptography usage risk identification system 720 resides.

For another example, as shown in FIG. 7C, only the cryptography usage risk identification agent 726 of the cryptography usage risk identification system 720 resides locally on a system of interest 718 distinct from the computing node 710. The cryptography usage risk identification agent 726 can receive the cryptography usage data from the cryptography usage analysis agent 724 on the computing node 710 either directly or through the endpoint intermediary 712 to determine the one or more applications associated with the identified cryptography usage risks. Information about the one or more applications and the associated cryptography usage risks may be transmitted back to the computing node 710, either to the cryptography usage analysis agent 724, e.g., to update the cryptographic inventory, or to the root cause identification agent 728, e.g., to further identify one or more root causes of the cryptography usage risks. As further shown in FIG. 7C, the root cause identification agent 728 residing on the computing node 710 can analyze the system of interest 716 through a network or remote file connection, e.g., operating scanners to remotely scan the local certificates, source codes, and software library. In this case, the root cause identification agent 728 may receive results (e.g., as part of the scanner information 606) from the certificate scanner module, the source code analysis module, and the software library scanner module of the system of interest 716.

For another example, as shown in FIG. 7E, only the active probe agent 730 of the cryptography usage risk identification system 720 resides locally on the computing node 730 distinct from the computing node 710. In this case, the active probe agent 730 on the computing node 714 may initiate communication with the system of interest 718 based on predetermined parameters, e.g., a list of server names, port numbers, different parameter values defining the protocol version and cryptographic characteristics of a TLS handshake, and other communication metadata and cryptography usage data The predetermined parameters which includes the preconfigured cryptography usage data may be communicated back to the cryptography usage analysis agent 724 on the computing node 710 to determine the cryptography usage risks. In some instances, network packets communicated between the system of interest 718 and a server initiated by the active probe agent 730 can be also captured by the network packet capture agent 722 to determine the cryptography usage data.

For another example, as shown in FIG. 7D, only the cryptography usage analysis agent 724 of the cryptography usage risk identification system 720 resides on the computing node 710 and all other agents of the cryptography usage risk identification system 720 reside on distinct computing nodes. In particular, as shown in FIG. 7D, the network packet capture agent 722 resides on the computing node 704, the cryptography usage risk identification agent 726 resides on the system of interest 718; the root cause identification agent 728 resides on the system of interest 716; and the active probe agent 730 resides on the computing node 714. In certain instances, the network packet capture agent 722 may reside on the computing node 708 which has direct connection with the network; and the network packet capture agent 722 may receive captured packets from the third-party network capture module 706, as shown in FIG. 7B. In certain instances, the cryptography usage risk identification agent 726 may communicate with the computing node 710 through the endpoint intermediary 712 as shown in FIG. 7B. In this case, the cryptography usage risk identification system 720 is configured as a distributed system.

FIG. 8 is a flow chart showing aspects of an example process 800 for identifying cryptography usage risks. For example, the example process 800 may be performed a cryptography usage risk identification system. In some implementations, the cryptography usage risk identification system includes a network packet capture agent, a cryptography usage analysis agent, a cryptography usage risk identification agent, and a root cause identification agent. In some instances, the cryptography usage risk identification system may be implemented as the cryptography usage risk identification system 104, 200, 720 as shown in FIGS. 1, 2, 7A-7E or another system. The example process 800 can be performed by a computer system, for example, by the computer system 900 associated with the computing nodes 102C shown in FIG. 1, or another type of computer system. The example process 800 may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated or otherwise repeated, or performed in another manner.

At 802, cryptography usage data is obtained. In some implementations, the cryptography usage data is obtained by operation of the network packet capture agent of the cryptography usage risk identification system. The cryptography usage data is obtained by examining network traffic communicated by computing nodes in the computing environment. packets communicated by the computing nodes within the network environment are captured. Communication metadata from the captured packets is extracted. The cryptography usage data is determined based on the communication metadata from the captured packets. In some implementations, the network packet capture is implemented and operated as the network packet capture agent 112, 202, 300, 722 in FIGS. 1-3, 7A-7E. In some instances, the cryptography usage data may be obtained from an active probe agent, which is configured to initiate communications on systems of interest according to preconfigured parameters, which may include the cryptography usage data including protocol, protocol versions, cryptographic algorithms, algorithm parameters, etc. In some implementations, the active probe agent is implemented and operated as the active probe agent 730 in FIGS. 7A-7E.

At 804, cryptography usage risks are evaluated based on the cryptography usage data. In some implementations, the cryptography usage risks are evaluated and identified by operation of a cryptography usage analysis agent based on the cryptography usage data (e.g., the protocol type, protocol version, cryptographic algorithm, cryptographic parameters, and other cryptography usage data) and predetermined criteria. In some implementations, the cryptography usage analysis agent is implemented and operated as the cryptography usage analysis agent 114, 204, 400, 724 as shown in FIGS. 1-2, 4, 7A-7E.

At 806, one or more applications associated with the identified cryptography usage risks are identified. In some implementations, the one or more applications associated with the identified cryptography usage risks are identified by operation of a cryptography usage risk identification agent. For example, in response to identifying presence of cryptography usage risks within the computing environment as determined by the cryptography usage analysis agent, a subset of the packets associated with the cryptography usage risk is identified. A subset of the computing nodes that communicated the subset of the packets is identified. Application network connectivity information is received from the subset of the computing nodes. The one or more applications are identified based on the application network connectivity information and the communication metadata from the subset of the packets; and the cryptography usage risks are associated with the one or more identified applications. In some implementations, the cryptography usage risk identification agent is implemented and operated as the cryptography usage risk identification agent 116, 206, 500, 726 as shown in FIGS. 1-2, 5, and 7A-7E.

Figure 9:
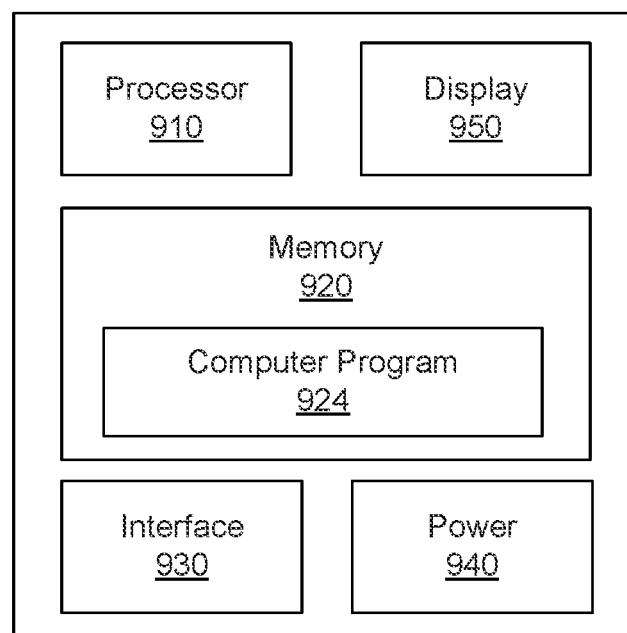
FIG. 9 is a block diagram of an example computer system.

FIG. 9 is a block diagram showing an example computer system 900. The example computer system 900 includes a data processing apparatus and one or more computer-readable storage devices. The term "data-processing apparatus" encompasses all kinds of apparatus, devices, nodes, and machines for processing data, including by way of example a programmable processor, a computer, a system on a chip, or multiple ones, or combinations, of the foregoing, e.g., processor 910. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g. computer program 924, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 910, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 920. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 940 provides power to the other components of the computer system 900. For example, the other components may operate based on electrical power provided by the power unit 940 through a voltage bus or other connection. In some implementations, the power unit 940 includes a battery or a battery system, for example, a rechargeable battery. In some implementations, the power unit 940 includes an adapter (e.g., an AC adapter) that receives an external power signal (from an external source) and coverts the external power signal to an internal power signal conditioned for a component of the computer system 900. The power unit 940 may include other components or operate in another manner.

To provide for interaction with a user, operations can be implemented on a computer having a display device, e.g. display 950, (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computer system 900 may include a single computing device, or multiple computers that operate in proximity or generally remote from each other and typically interact through a communication network, e.g., via interface 930. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship to each other.

The example interface 930 may provide communication with other systems or devices. In some cases, the interface 930 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 930 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, risks in cryptography usage during network communication between computing nodes are identified.

In a first example, a method for identifying cryptography usage risks in a computing environment includes by operation of a cryptography usage analysis agent, receiving cryptography usage data obtained by examining network traffic communicated by computing nodes in the computing environment, and identifying cryptography usage risks within the computing environment based on the cryptography usage data; by operation of a cryptographic risk identification agent, identifying one or more applications associated with the cryptography usage risks. Identifying the one or more applications includes identifying a subset of the network traffic associated with the cryptography usage risks; extracting communication metadata from the subset of the network traffic; identifying a subset of the computing nodes that communicated the subset of the network traffic; receiving application network connectivity information from the subset of the computing nodes; identifying the one or more applications based on the application network connectivity information and the communication metadata; and associating the cryptography usage risks with the one or more identified applications.

Implementations of the first example may include one or more of the following features. The method includes. obtaining the cryptography usage data by operation of a network packet capture agent. Obtaining the cryptography usage data includes capturing packets communicated by the computing nodes within the network environment; extracting communication metadata from the captured packets; and determining the cryptography usage data based on the communication metadata from the captured packets. The method includes initiating, by operation of an active probe agent, communication between at least two computing nodes; and receiving the cryptography usage data by the cryptography usage analysis agent from the active probe agent.

Implementations of the first example may include one or more of the following features. The communication metadata includes respective IP addresses associated with the subset of the computing nodes that communicated the subset of the network traffic, and the method includes identifying the subset of the computing nodes according to the respective IP addresses. Identifying the one or more applications includes comparing the communication metadata and the application network connectivity information. The communication metadata indicates a first list of ports associated with the subset of the network traffic, the application network connectivity information indicates a second list of ports used by the one or more applications, and identifying the one or more applications includes correlating the first list of ports with the second list of ports.

Implementations of the first example may include one or more of the following features. The method includes identifying, by operation of a root cause identification agent, one or more root causes of the identified cryptography usage risks. The root cause identification agent includes at least one of a source file scanner module, a certificate scanner module, or a software library scanner module, and identifying the one or more root causes of the cryptography usage risks includes at least one of: scanning, by operation of the source code analysis module, source codes to identify one or more source codes that cause the identified cryptography usage risks; scanning, by operation of the certificate scanner module, certificates to identify one or more certificates cause the identified cryptography usage risks; or scanning, by operation of the software library scanner module, software libraries to identify library usage related to the identified cryptography usage risks.

Implementations of the first example may include one or more of the following features. The identified cryptography usage risks include at least one of: packets communicated using vulnerable cryptographic algorithms breakable with current technology; packets communicated using weak cryptographic algorithms breakable with future technology; packets communicated using misused cryptographic algorithms; packets communicated using non-standard cryptographic algorithms that do not comply with policies; packets communicated using unrecommended cryptographic algorithms that cause overuse of computing resources; packets communicated without using cryptographic algorithms; packets communicated using vulnerable cryptographic algorithms breakable by quantum computers; or packets communicated using user-defined cryptographic algorithms. The user-defined cryptographic algorithms include geopolitically unfavorable cryptographic algorithms.

In a second example, a computer system includes a one or more processors, and memory storing instructions that are operable, when executed by the one or more processors, to perform one or more operations of the first example.

In a third example, a non-transitory computer-readable medium includes instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:
1. A method of identifying cryptography usage risks in a computing environment, the method comprising:
  by operation of a cryptography usage analysis agent:
    receiving cryptography usage data obtained by examining network traffic communicated by computing nodes in the computing environment; and identifying cryptography usage risks within the computing environment based on the cryptography usage data, wherein identifying the cryptography usage risks comprises:
  calculating cryptographic usage risk scores for respective communications based on comparing security characteristics of the communications with configuration data stored in the cryptography usage analysis agent according to predetermined criteria, wherein the predetermined criteria comprise:
    a security strength of a cryptographic algorithm and parameters, and
    a known weakness of a cryptographic protocol; and
  updating the cryptography usage risk scores for the respective communications according to the security characteristics of the respective communications;
by operation of a cryptographic risk identification agent, identifying one or more applications associated with the cryptography usage risks, wherein identifying the one or more applications comprises:
  identifying a subset of the network traffic associated with the cryptography usage risks;
  extracting communication metadata from the subset of the network traffic;
  identifying a subset of the computing nodes that communicated the subset of the network traffic;
  receiving application network connectivity information from the subset of the computing nodes;
  identifying the one or more applications based on the application network connectivity information and the communication metadata;
  associating the cryptography usage risks with the one or more identified applications; and
  generating application cryptographic risk information as output.

2. The method of claim 1, comprising,
by operation of an active probe agent, initiating communication between at least two computing nodes to obtain the cryptography usage data, wherein the cryptography usage analysis agent receives the cryptography usage data from the active probe agent.

3. The method of claim 1, comprising obtaining the cryptography usage data by operation of a network packet capture agent, wherein obtaining the cryptography usage data comprises:
  capturing packets communicated by the computing nodes within the network environment; and
  extracting communication metadata from the captured packets.

4. The method of claim 1, wherein the communication metadata comprises respective IP addresses associated with the subset of the computing nodes that communicated the subset of the network traffic, and the method comprises identifying the subset of the computing nodes according to the respective IP addresses.

5. The method of claim 1, wherein identifying the one or more applications comprises comparing the communication metadata and the application network connectivity information.

6. The method of claim 1, wherein the communication metadata indicates a first list of ports associated with the subset of the network traffic, the application network connectivity information indicates a second list of ports used by the one or more applications, and identifying the one or more applications comprises correlating the first list of ports with the second list of ports.

7. The method of claim 1, comprising identifying, by operation of a root cause identification agent, one or more root causes of the identified cryptography usage risks.

8. The method of claim 7, comprising:
  receiving, by operation of the root cause identification agent, scanner information from at least one of a source file scanner module, a certificate scanner module, or a software library scanner module, and identifying the one or more root causes of the cryptography usage risks comprises at least one of:
  scanning, by operation of the source code analysis module, source codes to identify one or more source codes that cause the identified cryptography usage risks;
  scanning, by operation of the certificate scanner module, certificates to identify one or more certificates cause the identified cryptography usage risks; or
  scanning, by operation of the software library scanner module, software libraries to identify library usage related to the identified cryptography usage risks.

9. The method of claim 1, wherein the identified cryptography usage risks comprise at least one of:
  packets communicated using vulnerable cryptographic algorithms breakable with current technology;
  packets communicated using weak cryptographic algorithms breakable with future technology;
  packets communicated using misused cryptographic algorithms;
  packets communicated using non-standard cryptographic algorithms that do not comply with policies;
  packets communicated using unrecommended cryptographic algorithms that cause overuse of computing resources;
  packets communicated without using cryptographic algorithms;
  packets communicated using vulnerable cryptographic algorithms breakable by quantum computers; or
  packets communicated using user-defined cryptographic algorithms.

10. The method of claim 9, wherein the user-defined cryptographic algorithms comprise geopolitically unfavorable cryptographic algorithms.

11. A computing system comprising a first computing device associated with a first entity, the first computing device comprising:
  one or more processors; and
  memory storing instructions that are operable when executed by the one or more processors to perform operations comprising:
    by operation of a cryptography usage analysis agent:
      receiving cryptography usage data obtained by examining network traffic communicated by computing nodes in the computing environment; and
      identifying cryptography usage risks within the computing environment based on the cryptography usage data, wherein identifying the cryptography usage risks comprises:
        calculating cryptographic usage risk scores for respective communications based on comparing security characteristics of the communications with configuration data stored in the cryptography usage analysis agent according to predetermined criteria, wherein the predetermined criteria comprise:

a security strength of a cryptographic algorithm and parameters, and
a known weakness of a cryptographic protocol; and
updating the cryptography usage risk scores for the respective communications according to the security characteristics of the respective communications;
by operation of a cryptographic risk identification agent, identifying one or more applications associated with the cryptography usage risks, wherein identifying the one or more applications comprises:
identifying a subset of the network traffic associated with the cryptography usage risks;
extracting communication metadata from the subset of the network traffic;
identifying a subset of the computing nodes that communicated the subset of the network traffic;
receiving application network connectivity information from the subset of the computing nodes;
identifying the one or more applications based on the application network connectivity information and the communication metadata;
associating the cryptography usage risks with the one or more identified applications; and
generating application cryptographic risk information as output.

12. The system of claim 11, wherein the operations comprise:
by operation of an active probe agent, initiating communication between at least two computing nodes to obtain the cryptography usage data, wherein the cryptography usage analysis agent receives the cryptography usage data from the active probe agent.

13. The system of claim 11, wherein the operations comprise obtaining the cryptography usage data by operation of a network packet capture agent, wherein obtaining the cryptography usage data comprises:
capturing packets communicated by the computing nodes within the network environment; and
extracting communication metadata from the captured packets.

14. The system of claim 11, wherein the communication metadata comprises respective IP addresses associated with the subset of the computing nodes that communicated the subset of the network traffic, and the method comprises identifying the subset of the computing nodes according to the respective IP addresses.

15. The system of claim 11, wherein identifying the one or more applications comprises comparing the communication metadata and the application network connectivity information.

16. The system of claim 11, wherein the communication metadata indicates a first list of ports associated with the subset of the network traffic, the application network connectivity information indicates a second list of ports used by the one or more applications, and identifying the one or more applications comprises correlating the first list of ports with the second list of ports.

17. A non-transitory computer-readable medium storing instructions that are operable when executed by data processing apparatus to perform operations comprising:
by operation of a cryptography usage analysis agent:
receiving cryptography usage data obtained by examining network traffic communicated by computing nodes in the computing environment; and
identifying cryptography usage risks within the computing environment based on the cryptography usage data, wherein identifying the cryptography usage risks comprises:
calculating cryptographic usage risk scores for respective communications based on comparing security characteristics of the communications with configuration data stored in the cryptography usage analysis agent according to predetermined criteria, wherein the predetermined criteria comprise:
a security strength of a cryptographic algorithm and parameters, and
a known weakness of a cryptographic protocol; and
updating the cryptography usage risk scores for the respective communications according to the security characteristics of the respective communications;
by operation of a cryptographic risk identification agent, identifying one or more applications associated with the cryptography usage risks, wherein identifying the one or more applications comprises:
identifying a subset of the network traffic associated with the cryptography usage risks;
extracting communication metadata from the subset of the network traffic;
identifying a subset of the computing nodes that communicated the subset of the network traffic;
receiving application network connectivity information from the subset of the computing nodes;
identifying the one or more applications based on the application network connectivity information and the communication metadata;
associating the cryptography usage risks with the one or more identified applications; and
generating application cryptographic risk information as output.

18. The non-transitory computer-readable medium of claim 17, wherein the operations comprise:
by operation of an active probe agent, initiating communication between at least two computing nodes to obtain the cryptography usage data, wherein the cryptography usage analysis agent receives the cryptography usage data from the active probe agent.

19. The non-transitory computer-readable medium of claim 17, wherein the operations comprise obtaining the cryptography usage data by operation of a network packet capture agent, wherein obtaining the cryptography usage data comprises:
capturing packets communicated by the computing nodes within the network environment; and
extracting communication metadata from the captured packets.

20. The non-transitory computer-readable medium of claim 17, wherein the communication metadata comprises respective IP addresses associated with the subset of the computing nodes that communicated the subset of the network traffic, and the method comprises identifying the subset of the computing nodes according to the respective IP addresses.

* * * * *